United States Patent
Hampel et al.

(10) Patent No.: US 10,631,346 B2
(45) Date of Patent: Apr. 21, 2020

(54) COMMUNICATING REMOTE AND LOCAL DATA IN A WIRELESS FRONTHAUL

(71) Applicant: QUALCOMM Incorporated, San Diego, CA (US)

(72) Inventors: Karl Georg Hampel, Hoboken, NJ (US); Hong Cheng, Bridgewater, NJ (US); Junyi Li, Chester, NJ (US); Navid Abedini, Raritan, NJ (US); Sundar Subramanian, San Diego, CA (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/055,878

(22) Filed: Aug. 6, 2018

(65) Prior Publication Data
US 2019/0053301 A1 Feb. 14, 2019

Related U.S. Application Data

(60) Provisional application No. 62/542,757, filed on Aug. 8, 2017.

(51) Int. Cl.
*H04W 76/12* (2018.01)
*H04W 84/04* (2009.01)
(Continued)

(52) U.S. Cl.
CPC ........... *H04W 76/12* (2018.02); *H04W 76/27* (2018.02); *H04W 80/02* (2013.01); *H04W 84/04* (2013.01); *H04W 88/08* (2013.01); *H04W 4/70* (2018.02)

(58) Field of Classification Search
CPC ..... H04W 76/12; H04W 76/27; H04W 80/02; H04W 84/04; H04W 88/08
See application file for complete search history.

(56) References Cited

U.S. PATENT DOCUMENTS 9,019,841 B2   4/2015  Tavildar et al.
2010/0260096 A1*  10/2010  Ulupinar ............. H04B 7/2606
                                                    370/315

FOREIGN PATENT DOCUMENTS

WO   2014063091 A1   4/2014
WO   2017039735 A1   3/2017

OTHER PUBLICATIONS

ZTE, "Considerations on adaptation layer in IAB", 3GPP Draft: R2-1807395; 3GPP TSG_RAN WG2 Meeting #102 May 21-25, 2018 (Year: 2018).*

(Continued)

*Primary Examiner* — Siming Liu
(74) *Attorney, Agent, or Firm* — Patterson & Sheridan, LLP

(57) ABSTRACT

Certain aspects of the present disclosure relate to methods and apparatus for communicating remote and local data in a wireless fronthaul of a wireless communication system. The method includes terminating a lower portion of a radio bearer for the UE, wherein the radio bearer comprises an upper portion and a lower portion. The method further includes forwarding the upper portion of the radio bearer for the UE to a network node over a wireless link. The method further includes carrying a lower portion of a second radio bearer with the BS and a multiplexing layer indicating whether the lower portion of the second radio bearer includes an upper portion of the second radio bearer corresponding to local data or a tunnel with the upper portion of the radio bearer for the UE corresponding to remote data.

30 Claims, 17 Drawing Sheets

(51) Int. Cl.
*H04W 88/08* (2009.01)
*H04W 76/27* (2018.01)
*H04W 80/02* (2009.01)
*H04W 4/70* (2018.01)

(56) References Cited

OTHER PUBLICATIONS

"3rd Generation Partnership Project; Technical Specification Group Radio Access Network; Study on Integrated Access and Backhaul; (Release 15)", 3GPP Standard; Technical Report; 3GPP TR 38.874, 3rd Generation Partnership Project (3GPP), Mobile Competence Centre; 650, Route Des Lucioles; F-06921 Sophia-Antipolis Cedex; France, vol. RAN WG2, No. V0.3.2, Jun. 21, 2018 (Jun. 21, 2018), pp. 1-40, XP051473123, [retrieved on Jun. 21, 2018].

AT&T IAESI: "Additional Benefit Considerations for Option 3-1", 3GPP Draft; R3-162696, 3rd Generation Partnership Project (3GPP), Mobile Competence Centre ; 658, Route Des Lucioles; F-06921 Sophia-Antipolis Cedex; France, vol. RAN WG3, No. Reno, USA; Nov. 10, 2016-Nov. 14, 2016, Nov. 14, 2016 (Nov. 14, 2016), XP051178804, 5 pages, Retrieved from the Internet: URL:http://www.3gpp.org/ftp/Meetings_3GPP_SYNC/RAN3/Docs/ [retrieved on Nov. 14, 2016].

International Search Report and Written Opinion—PCT/US2018/045630—ISA/EPO—dated Oct. 17, 2018.

Qualcomm Incorporated: "Integrated Access and Backhaul Architectures", 3GPP Draft; R3-181078_IAB Architectures, 3rd Generation Partnership Project (3GPP), Mobile Competence Centre; 650, Route Des Lucioles; F-06921 Sophia-Antipolis Cedex; France, vol. RAN WG3, No. Athens, Greece; Jan. 26, 2018-Mar. 2, 2018, Feb. 16, 2018 (Feb. 16, 2018), XP051401412, 5 pages, Retrieved from the Internet: URL: http://www.3gpp.org/ftp/tsg%5Fran/WG3%5Flu/TSGR3%5F99/Docs/ [retrieved on Feb. 16, 2018].

ZTE: "Considerations on adaptation layer in IAB", 3GPP Draft; R2-1807395—Considerations on Adaptation Layer in IAB, 3rd Generation Partnership Project (3GPP), Mobile Competence Centre; 658, Route Des Lucioles; F-06921 Sophia-Antipolis Cedex; FRA, vol. RAN WG2, No. Busan, Korea; May 21, 2018-May 25, 2018, May 11, 2018 (May 11, 2018), XP051464638, 5 pages, Retrieved from the Internet: URL: http://www.3gpp.org/ftp/tsg%5Fran/WG2%5FRL2/TSGR2%5F102/Docs [retrieved on May 11, 2018].

\* cited by examiner

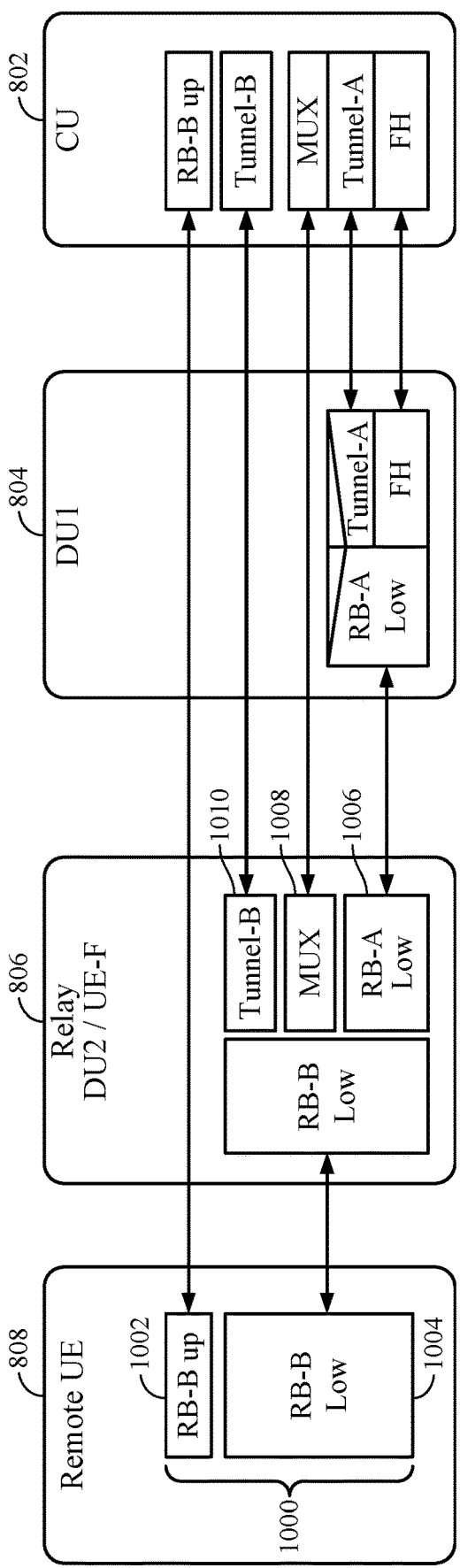
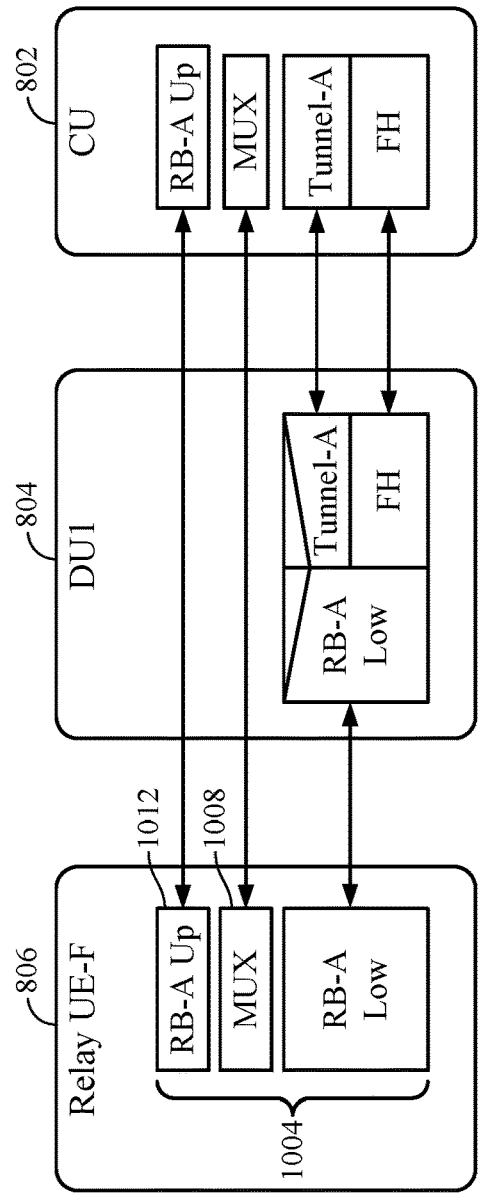
FIG. 10
FIG. 10A

COMMUNICATING REMOTE AND LOCAL DATA IN A WIRELESS FRONTHAUL

CROSS-REFERENCE TO RELATED APPLICATIONS

This application claims the benefit of U.S. Provisional Patent No. 62/542,757, filed Aug. 8, 2017. The content of the provisional application is hereby incorporated by reference in its entirety.

INTRODUCTION

The present disclosure relates generally to communication systems, and more particularly, to methods and apparatus for communicating remote and local data in a wireless fronthaul of a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, gigabit NodeB (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for communicating remote and local data in a wireless fronthaul of a wireless network, the wireless fronthaul comprising a relay configured to wirelessly communicate with a user equipment (UE) over a first wireless link and a base station (BS) over a second wireless link, wherein a radio bearer comprising an upper portion and a lower portion is established between the UE and a network node of the wireless network, and wherein the UE communicates with the network node via the relay and the BS, the method comprising: terminating, at the relay, the lower portion of the radio bearer for the UE; forwarding, at the relay, the upper portion of the radio bearer for the UE to the network node over the second wireless link; and carrying, at the relay, a lower portion of a second radio bearer between the relay and the BS and a multiplexing layer indicating whether the lower portion of the second radio bearer includes an upper portion of the second radio bearer corresponding to local data or a tunnel with the upper portion of the radio bearer for the UE corresponding to remote data.

Certain aspects provide a computer readable medium having instructions stored thereon that when executed by a wireless device cause the wireless device to perform a method for communicating remote and local data in a wireless fronthaul of a wireless network, the wireless fronthaul comprising a relay configured to wirelessly communicate with a user equipment (UE) over a first wireless link and a base station (BS) over a second wireless link, wherein a radio bearer comprising an upper portion and a lower portion is established between the UE and a network node of the wireless network, and wherein the UE communicates with the network node via the relay and the BS, the method comprising: terminating, at the relay, the lower portion of the radio bearer for the UE; forwarding, at the relay, the upper portion of the radio bearer for the UE to the network node over the second wireless link; and carrying, at the relay, a lower portion of a second radio bearer between the relay and the BS and a multiplexing layer indicating whether the lower portion of the second radio bearer includes an upper portion of the second radio bearer corresponding to local data or a tunnel with the upper portion of the radio bearer for the UE corresponding to remote data.

Certain aspects provide a wireless device for communicating remote and local data in a wireless fronthaul of a wireless network, the wireless device comprising: a memory; and a processor coupled to the memory, the processor being configured to: communicate with a user equipment (UE) over a first wireless link; communicate with a base station (BS) over a second wireless link; terminate a lower portion of a radio bearer for the UE, wherein the radio bearer comprises an upper portion and a lower portion, wherein the radio bearer is established between the UE and a network node of the wireless network, and wherein the UE is configured to communicate with the network node via the wireless device and the BS; forward the upper portion of the radio bearer for the UE to the network node over the second wireless link; and carry a lower portion of a second radio bearer between the wireless device and the BS and a multiplexing layer indicating whether the lower portion of the second radio bearer includes an upper portion of the second radio bearer corresponding to local data or a tunnel with the upper portion of the radio bearer for the UE corresponding to remote data.

Certain aspects provide a wireless device for communicating remote and local data in a wireless fronthaul of a wireless network, the wireless device comprising: means for communicating with a user equipment (UE) over a first wireless link; communicate with a base station (BS) over a second wireless link; means for terminating a lower portion of a radio bearer for the UE, wherein the radio bearer comprises an upper portion and a lower portion, wherein the radio bearer is established between the UE and a network node of the wireless network, and wherein the UE is configured to communicate with the network node via the wireless device and the BS; means for forwarding the upper portion of the radio bearer for the UE to the network node over the second wireless link; and means for carrying a lower portion of a second radio bearer between the wireless device and the BS and a multiplexing layer indicating whether the lower portion of the second radio bearer includes an upper portion of the second radio bearer corresponding to local data or a tunnel with the upper portion of the radio bearer for the UE corresponding to remote data.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10 illustrates an example communications protocol stack with a MUX layer between a lower and upper portion of a RB used for communicating remote data, in accordance with certain aspects of the present disclosure.

FIG. 10A illustrates an example communications protocol stack with a MUX layer between a lower and upper portion of a RB used for communicating local data, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
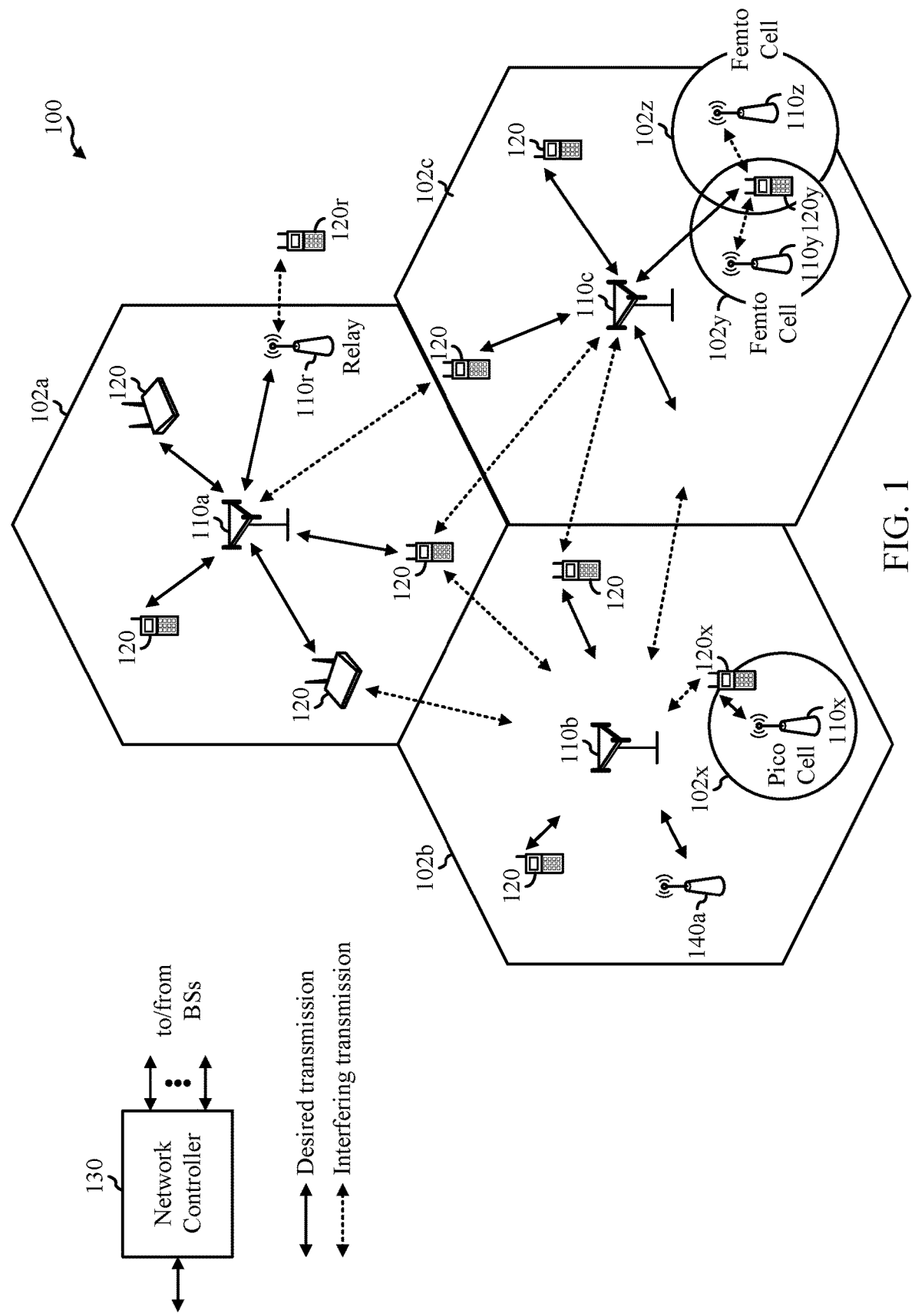
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

In certain aspects, due to the high carrier frequency used for mmW, the wireless range for communicating between wireless devices using mmW may be limited. Therefore, in certain aspects, gNBs (e.g., DUs of gNBs) may be densely deployed in a geographic area to provide coverage for UEs. The rollout of such densely deployed gNBs can create a backhaul/fronthaul problem since CUs and DUs of gNBs are typically connected together by wired connections, and the digging and construction required to place such wired connections may be expensive or not feasible.

However, mmW devices do have a high link capacity (e.g., have a high data bandwidth) and also have reduced inter-link interference. Accordingly, in certain aspects, gNBs (e.g., DUs of gNBs) may be configured to self-backhaul data, effectively acting as wireless relays for data for other gNBs. Therefore, gNBs acting as relays may wirelessly forward data over one hop or multiple hops until a gNB with a wired connection is reached to access the core network. Such wireless relaying of data between gNBs may be referred to as integrated access backhauling (IAB).

The connections between DUs and with a CU may be referred to herein as a fronthaul instead of being referred to as part of the backhaul. Further, the connection (e.g., a wired connection) from the CU to a core network may be referred to as a backhaul.

In one example, a second DU may be configured to act as a relay between remote UEs and a first DU. The first DU may have a wired connection to the CU as part of the fronthaul. Further, the second DU may communicate wirelessly with the first DU over a wireless connection as part of the fronthaul (e.g., thereby using wireless fronthauling between DUs). On an uplink, the second DU, accordingly, may receive data from remote UEs with a destination of the CU/core network and forward such data originated by the remote UEs to the first DU, which then forwards the data to the CU and then on to the core network. Such data originated by the remote UEs may be referred to as remote data of the second DU. Further, on the uplink, the second DU itself may generate data with a destination of the CU/core network and forward such data originated by the second DU to the first DU, which then forwards the data to the CU and then on to the core network. Such data originated by the second DU may be referred to as local data of the second DU.

Similarly, on a downlink, the CU may generate data for the remote UE (e.g., referred to as remote data of the second DU) or data for the second DU (referred to as local data of the second DU) and send the data to the first DU, which sends the data to the second DU. If the data is local data, the second DU processes the data. If the data is remote data, the second DU forwards the data to the remote UE.

The second DU, first DU, and CU, may each send/receive local or remote data of the second DU, and therefore may need to be able to distinguish between the local or remote data of the second DU in order to properly process/handle the data. Accordingly, aspects of the present disclosure relate to configuring and operating DUs and CUs to distinguish between local and remote traffic when using wireless fronthauling between DUs. Though certain aspects are described herein with respect to CUs and DUs, the same techniques may be applied for wireless communication between other components of or types of base stations or gNBs in place of CUs and DUs. Certain aspects provide a technical improvement to the technical field of telecommunications. In particular, certain aspects provide techniques to relay data between wireless devices that previously required directed wired connections. Such wireless relaying of data reduces construction costs and allows for communications in previously inaccessible geographic locations. Certain aspects further provide advantages such as allowing devices to efficiently distinguish between data associated with different devices, thereby requiring less computational complexity and less compute cycles to process data. This may further reduce latency in processing data and transmitting it wirelessly at a relay between devices.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, BSs 110 (e.g., including CUs and DUs corresponding to BSs 110) and UEs 120 may be configured to perform techniques discussed herein for distinguishing between local and remote traffic when using wireless fronthauling.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc. In certain aspects, a relay station may be a DU.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 KHz and the minimum resource allocation (called a 'resource block') may be 12 subcarriers (or 180 KHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 KHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
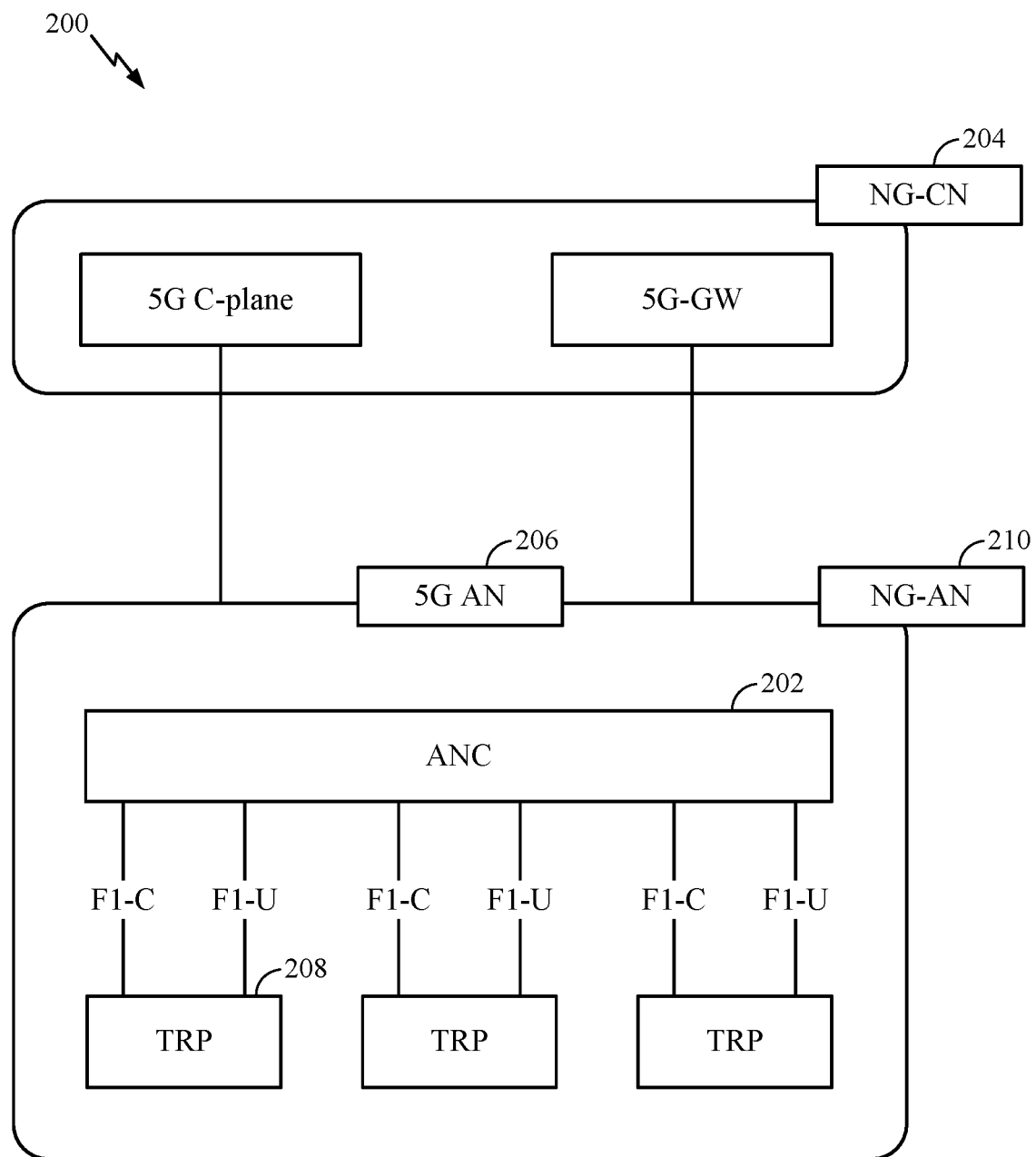
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE. One or more TRPs 208 may communicate with one another over a wireless fronthaul as discussed herein. For example, one or more TRPs 208 may be configured to perform techniques discussed herein for distinguishing between local and remote traffic when using wireless fronthauling.

The local architecture 200 may be used to illustrate fronthaul definition. The architecture may be defined that support fronthauling solutions across different deployment types. For example, the architecture may be based on transmit network capabilities (e.g., bandwidth, latency, and/ or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208 such as over a wireless fronthaul as discussed herein. For example, cooperation may be preset within a TRP and/or across TRPs via the ANC 202.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS (e.g., gNB) may include a central unit (CU) (e.g., ANC 202) and/or one or more distributed units (e.g., one or more TRPs 208).

Figure 3:
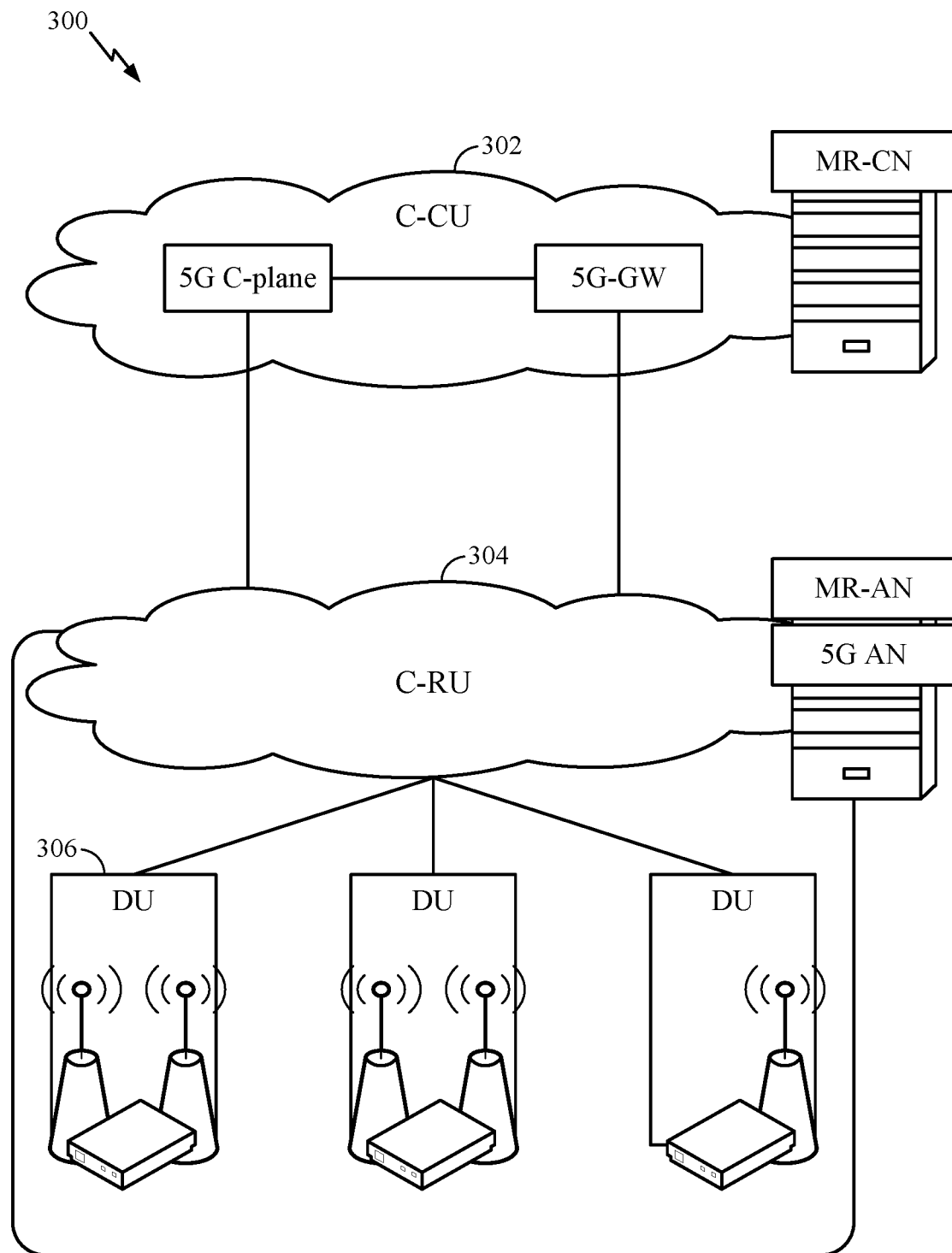
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CNU) 302 may host core network functions. The C-CNU may be centrally deployed. C-CNU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality. DUs 306 may communicate with one another over a wireless fronthaul as discussed herein. For example, one or more DUs 306 may be configured to perform techniques discussed herein for distinguishing between local and remote traffic when using wireless fronthauling.

Figure 4:
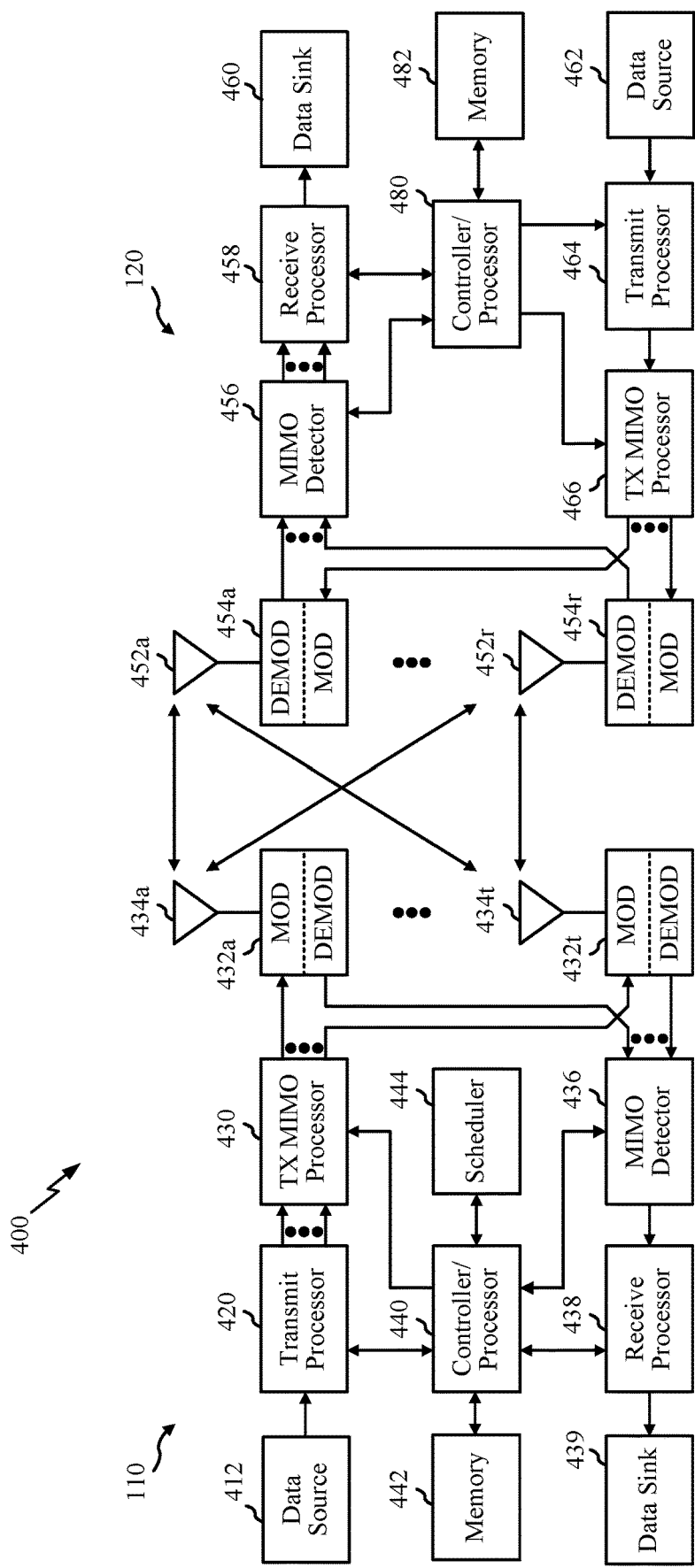
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein related to distinguishing between local and remote traffic when using wireless fronthauling.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
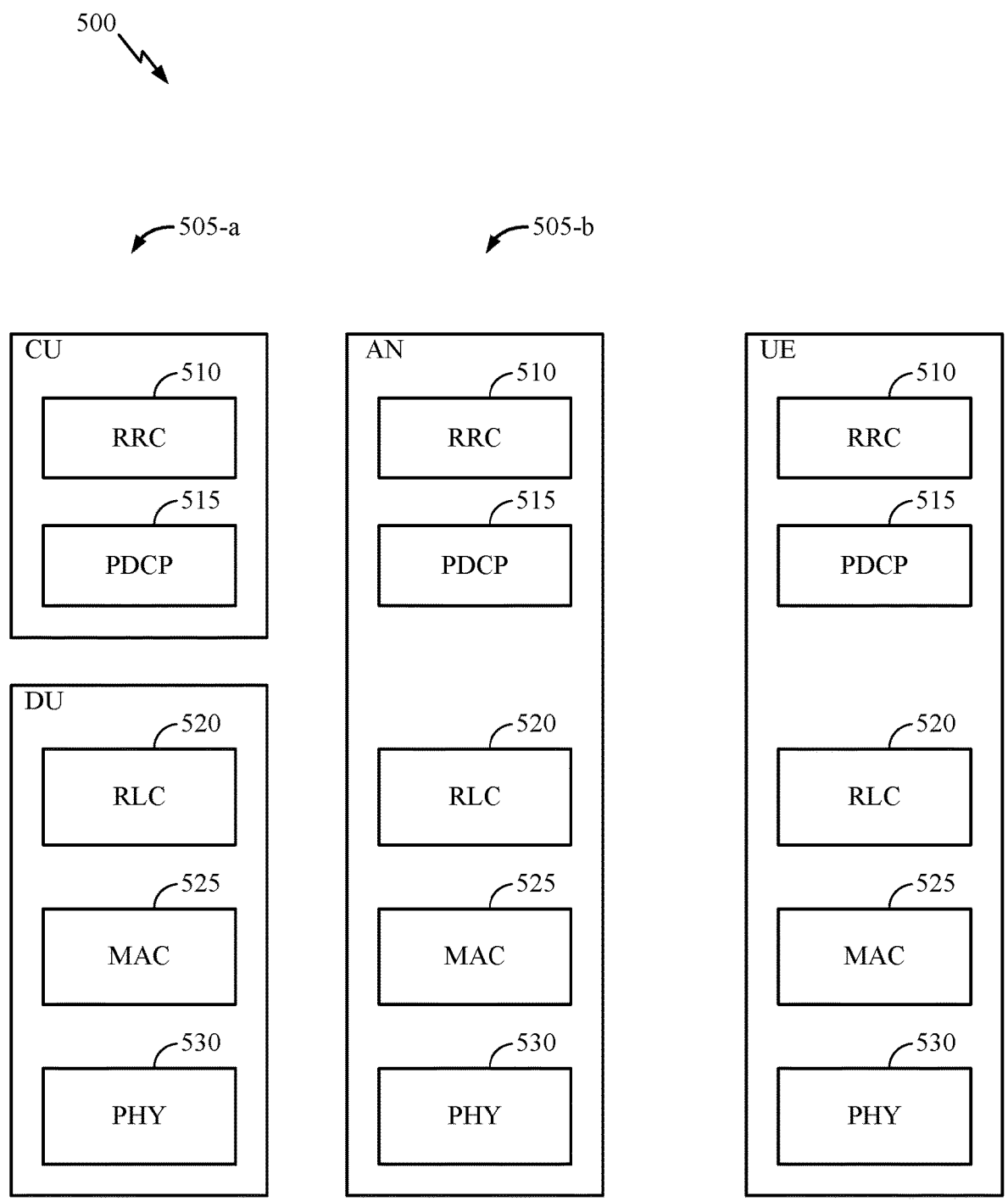
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
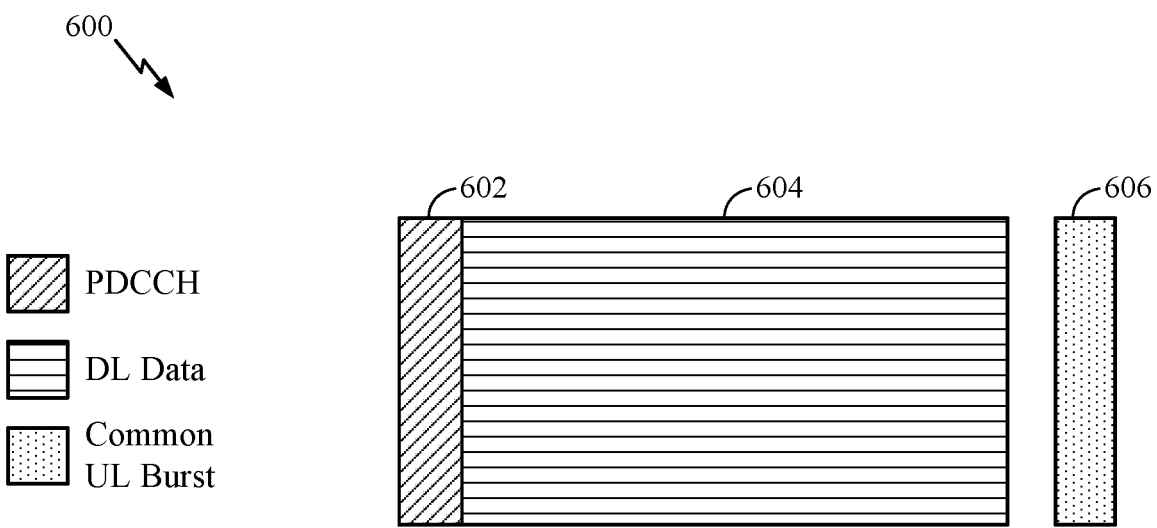
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
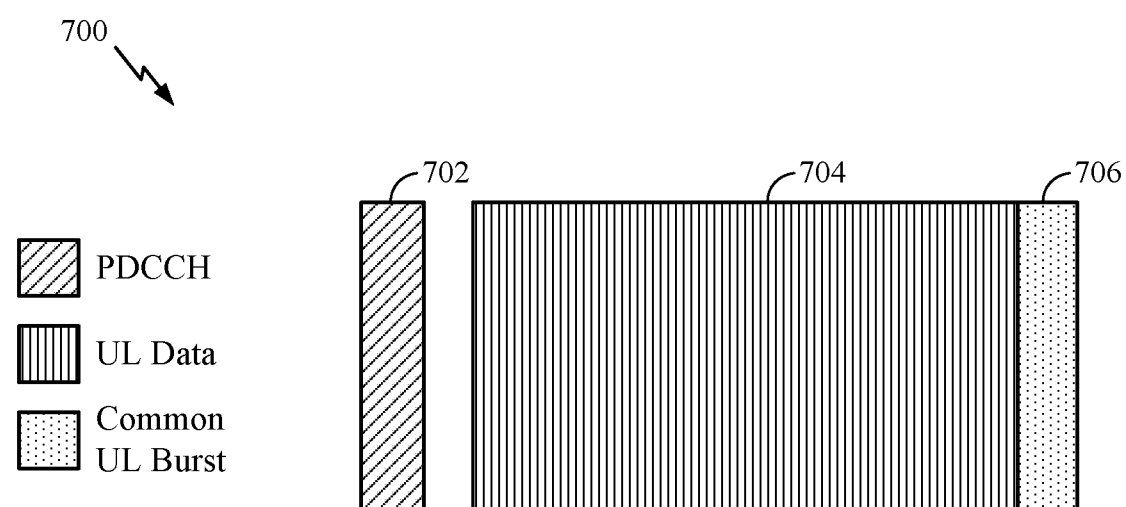
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Communication of Remote and Local Data in a Wireless Fronthaul

In certain aspects, communication between a UE (e.g., UE 120 of FIG. 1) and an AN (e.g., AN 206 of FIG. 2) may be via an ANC (e.g., ANC 202 of FIG. 2, a CU (e.g., a type of network node)). As discussed, the CU may communicate via a backhaul interface (e.g., a wired interface) with the core network (e.g., NG-CN 204 of FIG. 2). The CU may further be connected via a wired fronthaul interface to one or more TRPs (e.g., TRPs 208 of FIG. 2, DUs). These DUs connected to the CU via a wired interface may further be connected themselves to other DUs acting as relays via a wireless fronthaul interface to further extend the coverage provided by DUs to UE 120 without requiring wired connections.

As discussed, in order to provide coverage to the UE 120 across geographical areas, dense deployment of cells may be needed. For example, the UE 120 may utilize communication technologies with limited range (e.g., mmW with line-of-sight range). In certain aspects, it may not be feasible to connect every cell via a backhaul interface (e.g., a wired interface such as N2 (S1-MME), N3 (S1-U), etc.) such as due to physical restrictions and/or cost. Accordingly, in certain aspects, a relay station (e.g., relay DU) may be used to receive wireless transmissions including packets from the UE and further wirelessly transmit the packets to the CU via a DU with a wired connection to the CU (and optionally via one or more additional relay DUs using wireless connections).

Figure 8:
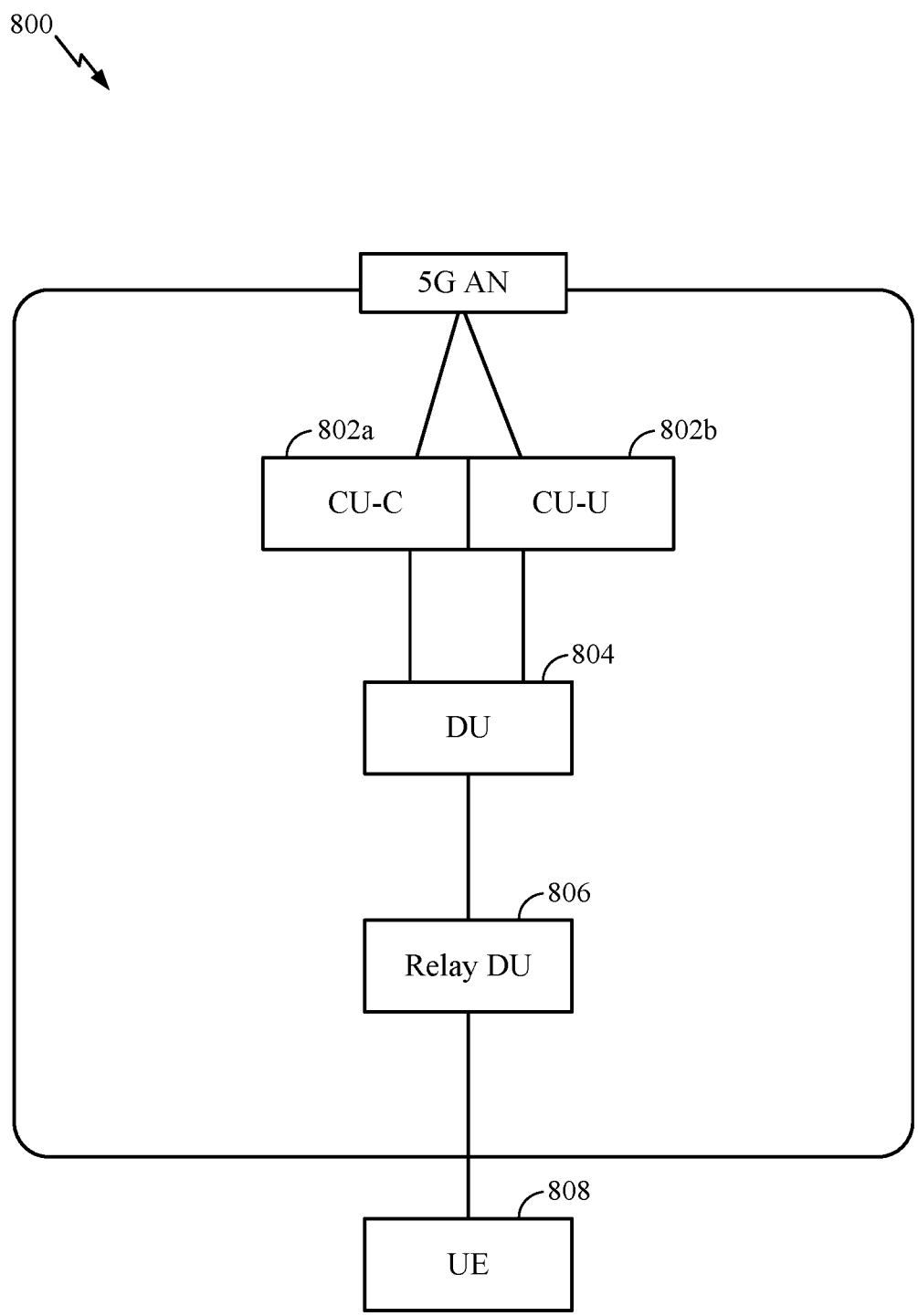
FIG. 8 is a block diagram illustrating an example physical architecture of a distributed RAN that supports wireless relay, in accordance with certain aspects of the present disclosure.

FIG. 8 is a block diagram illustrating an example physical architecture of a distributed RAN 800 (e.g., similar to RAN 200 of FIG. 2) that supports wireless relay, in accordance with certain aspects of the present disclosure. As shown, the RAN 800 includes a CU central control plane (CU-C) 802*a* (e.g., similar to ANC 202 of FIG. 2) used for handling control plane packets (e.g., signaling information) and a CU user plane (CU-U) 802*b* (e.g., similar to ANC 202 of FIG. 2) used for handling user plane packets (e.g., traffic information). Though shown as separate units, CU-C 802*a* and CU-U 802*b* may be logical units of a single physical CU. The RAN 800 further includes a DU 804 (e.g., similar to TRP 208 of FIG. 2) and a relay DU 806 (e.g., similar to TRP 208 of FIG. 2).

In certain aspects, the CU-C 802*a* and CU-U 802*b*, DU 804, and relay DU 806 form an access node (e.g., 5G access node). In certain aspects, the CU-C 802*a* and CU-U 802*b* are connected by a wired interface to the DU 804. In certain aspects (not shown), CU-C 802*a* and CU-U 802*b* are connected directly to relay DU 806 via a wireless interface. Further, in certain aspects, DU 804 and relay DU 806 are not connected by a wired interface and instead communicate over a wireless interface. Further, UE 808 (e.g., similar to UE 120 of FIG. 1) may be configured to communicate via a wireless interface with relay DU 806. Though now shown, there may be additional relay DUs 806 between DU 804 and UE 808 configured to wirelessly interface with one another to forward packets between one another.

In certain aspects, relay DU 806 is configured to act as a wireless relay between DU 804 and UE 808. Accordingly, DU 804 and relay DU 806 may implement a portion of a wireless fronthaul for the CU-C 802*a* and CU-U 802*b*. For example, DU relay 806 may be configured to receive packets (e.g., UL packets) from UE 808 and forward the packets wirelessly to DU 804, which forwards the packets over a wired connection to CU-C 802*a* or CU-U 802*b*. Further, DU 804 may be configured to receive packets (e.g., DL packets) from CU-C 802*a* or CU-U 802*b* over the wired connection and forward the packets wirelessly to relay DU 806, which forwards the packets wirelessly to UE 808. Though certain aspects are described with respect to DUs (e.g., DU 804 and relay DU 806) acting as wireless relays, it should be noted that other devices may instead be used to perform the functions described with respect to any one or all of the DUs acting as wireless relays. For example, instead of a DU, a UE, gNB, or other access node may perform the functions described with respect to the DU acting as a wireless relay. Further, though certain aspects are described with respect to CUs, it should be noted that other devices (e.g., gNBs) may instead be used to perform the functions described with respect to any one or all of the CUs.

In certain aspects, each of the wireless links between relay DUs 806, between relay DU 806 and UE 808, and between relay DU 806 and DU 804 is defined by one or more radio links (e.g., as identified by one or more cell radio network temporary identifiers (C-RNTIs)) (e.g., including one or more backhaul links, one or more access links, or a combination of one or more backhaul links and one or more access links). In the architecture of a distributed RAN 800 using both CUs and DUs for UE 808 to communicate with the access network, the UE 808 connects to the relay DU

806/DU 804/CU-C 802*a* or CU-U 802*b* and establishes one or more radio bearers (RBs) corresponding to the connections. For example, the UE 808 establishes a signaling RB (SRB) for carrying signal information and a data RB (DRB) for carrying data traffic. A RB may specify the configuration of protocol layers (e.g., Layer-2 and physical layer) between two devices.

Figure 9:
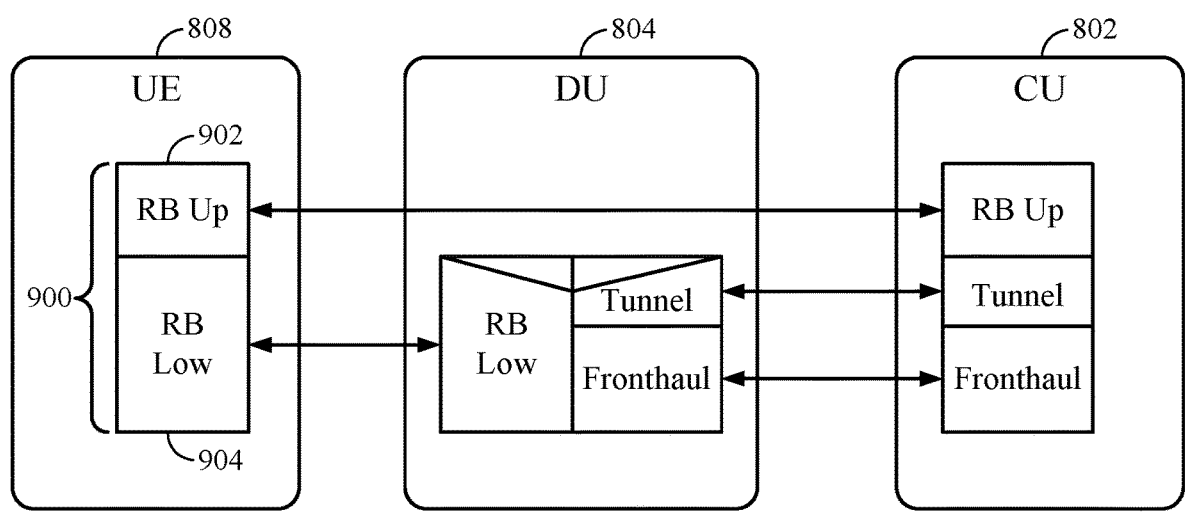
FIG. 9 illustrates an example communications protocol stack for communicating in a RAN such as the RAN of FIG. 8, in accordance with certain aspects of the present disclosure.

FIG. 9 illustrates an example communications protocol stack for communicating in a RAN such as RAN 800, in accordance with certain aspects of the present disclosure. In the example shown, UE 808 directly communicates wirelessly with DU 804, which communicates with CU 802 (e.g., a single physical CU implementing CU-C 802*a* or CU-U 802*b*) via a wired interface. In particular, a RB 900 is established between UE 808 and CU 802, which is shown as a communications protocol stack.

In certain aspects, the UE 808 utilizes the RB 900 established between UE 808 and CU 802 for communication with the DU 804. For example, RB 900 is divided into an RB upper portion (RB Up) 902 and an RB lower portion (RB Low) 904. In certain aspects, the RB Up 902 includes a PDCP layer, such as PDCP layer 515 of FIG. 5. The RB Up 902 may further include a portion of a RLC layer (e.g., RLC-hi, which performs retransmissions), such as RLC layer 520 of FIG. 5. In certain aspects, the RB Low 904 includes a RLC layer (or a portion of a RLC layer, such as RLC-lo which performs segmentation only), such as RLC layer 520 of FIG. 5. RB Low 904 may further include a MAC layer (e.g., MAC layer 525 of FIG. 5) and a PHY layer (e.g., PHY layer 530 of FIG. 5).

In certain aspects the UE 808 only sustains (e.g., utilizes, maintains packet encapsulation, etc.) the RB Low 904 to connect with DU 804 and sustains the RB Up 902 to connect with CU 802 (via DU 804). Further, in certain aspects, RB Low 904 is extended on the fronthaul from DU 804 to CU 802 using a normal fronthaul transport as shown and a tunnel layer (e.g., including a tunnel ID) to map the fronthaul transport to the RB 900 of the UE 808. Accordingly, SRBs may be routed from UE 808 to CU-C 802*a* and DRBs may be routed from UE 808 to CU-U 802*b*. In certain aspects, a signaling connection is sustained between CU-C 802*a* and DU 804, referred to as F1-C. One portion of F1-C may be a fronthaul application protocol, referred to as F1-AP.

In certain aspects, for relay DU 806 to act as a wireless relay between UE 808 and DU 804, the relay DU 806 supports both a UE function (e.g., functionality similar to UE 808) and a DU function (e.g., functionality similar to DU 804). In particular, relay DU 806 may utilize the DU function to communicate with UE 808 and the UE function to communicate with DU 804. Accordingly, the UE 808 can connect to the relay DU 806 in a similar manner that it connects to a gNB (e.g., using a UMTS air interface (Uu interface)), so no changes need to be made to the UE 808 to support the relay function of relay DU 806. Further, the relay DU 806 can connect to an access node including DU 804, CU-C 802*a* (via DU 804), and CU-U 802*b* (via DU 804) using SRBs and DRBs using the UE function in the same manner as UE 808 would.

In certain aspects, relay DU 806 uses an upper portion of the SRBs and DRBs to connect to CU-C 802*a* and CU-U 802*b* (via DU 804) and a lower portion of the SRBs and DRBs to connect to DU 804 for communicating local data of the relay DU 806 (e.g., for an access link of DU 806). Further, in certain aspects, relay DU 806 uses the lower portion of the SRBs and DRBs to communicate remote data of the UE 808 (e.g., for an access link of UE 808). Since both local data and remote data is communicated (e.g., on the UL or DL as discussed) on the lower portion of the SRBs and DRBs, the relay DU 806, DU 804, CU-C 802*a*, and CU-U 802*b* need to be able to distinguish between whether the data in the lower portion of the SRBs and DRBs is local data or remote data.

In certain aspects, techniques herein relate to separating local and remote traffic in a RB by inserting a multiplexing (MUX) layer (also referred to as an adaptation layer) between the lower and upper portion of the RB.

FIG. 10 illustrates an example communications protocol stack with a MUX layer between a lower and upper portion of a RB used for communicating remote data, in accordance with certain aspects of the present disclosure. FIG. 10A illustrates an example communications protocol stack with a MUX layer between a lower and upper portion of a RB used for communicating local data, in accordance with certain aspects of the present disclosure.

In the example shown, UE 808 directly communicates wirelessly with relay DU 806, which communicates wirelessly with DU 804. DU 804 communicates with CU 802 (e.g., a single physical CU implementing CU-C 802*a* or CU-U 802*b*) via a wired interface. In particular, a RB 1000 is established between UE 808, relay DU 806, DU 804, and CU 802, which is shown as a communications protocol stack for the devices to communicate with one another.

In certain aspects, RB 1000 is divided into an RB upper portion (RB-B Up) 1002 and an RB lower portion (RB-B Low) 1004. In certain aspects, the UE 808 only sustains the RB-B Low 1004 to connect with relay DU 806 (e.g., using a DU function of DU 806) and sustains the RB Up 1002 to connect with CU 802 (via relay DU 806 and DU 804).

In certain aspects, relay DU 806 (e.g., a UE function of relay DU 806) is configured to sustain the RB-B Low 1004 of RB 1000 to communicate with DU 804 and CU 802. In particular, RB-B Low 1004 is divided into multiple portions including a RB lower portion (RB-A Low) 1006. In certain aspects the relay DU 806 only sustains the RB-A Low 1006 to connect with DU 804. Further, in certain aspects, RB-A Low 1006 is extended on the fronthaul from DU 804 to CU 802 using a normal fronthaul transport as shown and a tunnel layer (Tunnel-A) including a tunnel ID to map the fronthaul transport to the RB 1000 of the relay DU 806 and UE 808 so packets can be forwarded to relay DU 806 from DU 804 based on the tunnel ID included in Tunnel-A.

In certain aspects, for remote data from UE 808, as shown in FIG. 10, relay DU 806 extends RB-B Low 1004 to communicate with CU 802 (via DU 804) by sustaining with CU 802 a Tunnel B 1010. The Tunnel B 1010 may include a tunnel ID that maps to UE 808 so that packets can be forwarded to the correct UE 808 based on the tunnel ID included in Tunnel-B 1010 by relay DU 806, without relay DU 806 needing to read RB-B Up 1002.

In certain aspects, for local data of relay DU 806, as shown in FIG. 10A, instead of using a Tunnel B 1010, relay DU 806 sustains a RB upper portion (RB-A up) 1012 with CU 802 to communicate with CU 802.

Therefore, RB-A low 1006 and Tunnel A may need to carry RB-A up 1012 for local data and Tunnel B 1010 (which holds RB-B Up 1002) for remote data. For relay DU 806 and CU 802 to be able to differentiate between RB-A up 1012 and Tunnel B 1010, and accordingly differentiate between local data and remote data, in certain aspects a MUX layer 1008 is inserted between RB-A low 1006 and either RB-A up 1012 or Tunnel B 1010, depending on which is included. In certain aspects, MUX layer 1008 inserts a field into the protocol stack which indicates if the encapsulated data refers to local data or remote data.

In certain aspects, on the DL, CU 802 is configured to encapsulate DL packets destined for UE 808 (i.e., remote data) with the communications protocol stack shown in FIG. 10 in CU 802. Further, in certain aspects, on the DL, CU 802 is configured to encapsulate DL packets destined for relay DU 806 (i.e., local data) with the communications protocol stack shown in FIG. 10A in CU 802.

Figure 11:
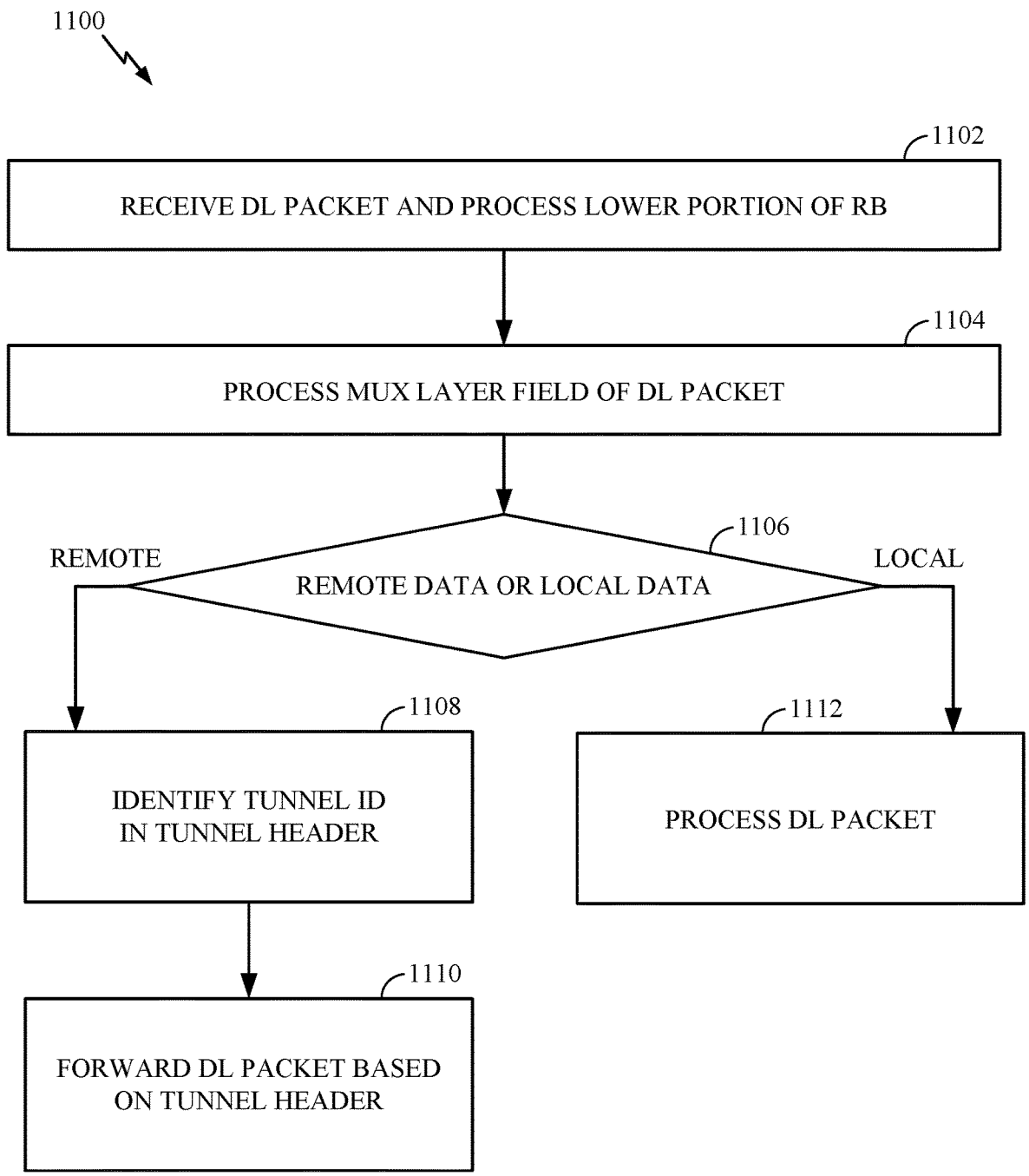
FIG. 11 illustrates example operations for processing DL packets from a CU at a relay DU, in accordance with certain aspects of the present disclosure.

FIG. 11 illustrates example operations 1100 for processing DL packets from a CU at a relay DU. According to certain aspects, operations 1100 may be performed by a relay DU, such as relay DU 806.

At 1102, the relay DU processes the lower portion of the RB corresponding to RB-A low of a received DL packet and determines the lower portion of the RB to be RB-A low. At 1104, the relay DU processes the MUX layer field of the DL packet based on the lower portion of the RB being RB-A low indicating (e.g., implicitly) that the DL packet includes a MUX layer field. At 1106, based on the MUX layer field, the relay DU determines if the packet includes remote data or local data based on an indicator in the MUX layer field.

At 1108, if the relay DU determines the packet includes remote data, the relay DU determines the packet includes a Tunnel-B header and identifies the tunnel ID in the Tunnel-B header. The tunnel ID may identify the RB-B low (e.g., UE 808) over which to forward the packet. At 1110, the relay DU forwards the packet based on the tunnel ID to UE 808.

At 1112, if the relay DU determines the packet includes local data, the relay DU determines the packet includes a RB-A Up and processes the RB-A Up at the relay DU.

In certain aspects, on the UL, relay DU 806 is configured to encapsulate UL packets received from UE 808 (i.e., remote data) to send to CU 802 with the communications protocol stack shown in FIG. 10 in relay DU 806. Further, in certain aspects, on the UL, relay DU 806 is configured to encapsulate UL packets generated by relay DU 806 (i.e., local data) to send to CU 802 with the communications protocol stack shown in FIG. 10A in relay DU 806.

Figure 12:
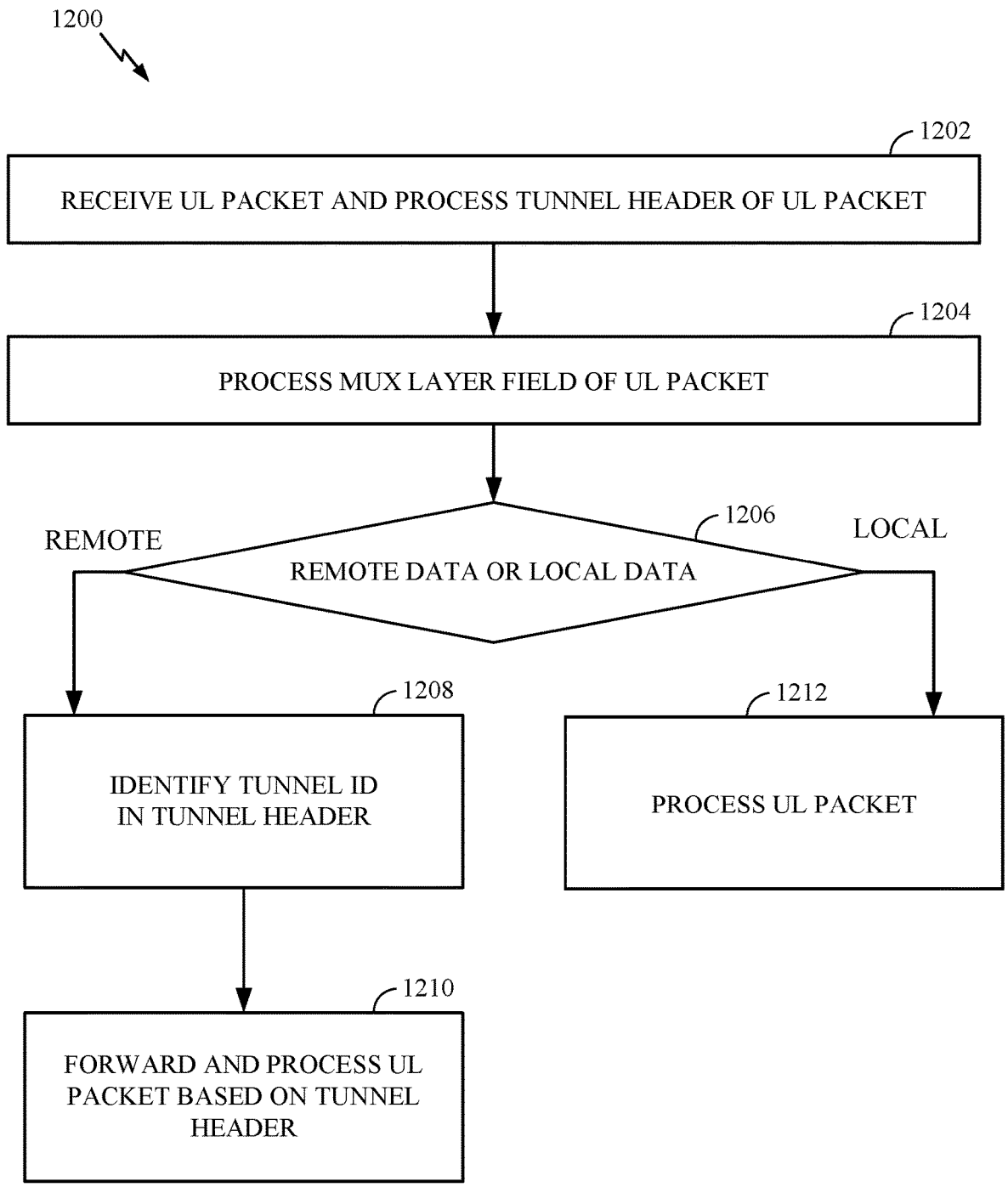
FIG. 12 illustrates example operations for processing UL packets from a relay DU to a CU, in accordance with certain aspects of the present disclosure.

FIG. 12 illustrates example operations 1200 for processing UL packets from a relay DU to a CU. According to certain aspects, operations 1200 may be performed by a CU, such as CU 802.

At 1202, the CU processes Tunnel-A and identifies a tunnel ID in Tunnel-A. At 1204, the CU processes the MUX layer field of the UL packet based on the Tunnel-A indicating (e.g., implicitly) that the UL packet includes a MUX layer field. At 1206, based on the MUX layer field, the CU determines if the packet includes remote data or local data based on an indicator in the MUX layer field.

At 1208, if the CU determines the packet includes remote data, the CU determines the packet includes a Tunnel-B header and identifies the tunnel ID in the Tunnel-B header. At 1210, the CU identifies the RB-B Up where the packet is to be forwarded and processed.

At 1212, if the CU determines the packet includes local data, the CU determines the packet includes a RB-A Up and processes the RB-A Up at the CU.

In certain aspects, instead of extending the MUX layer from relay DU 806 to CU 802, the MUX layer may only be extended between relay DU 806 to DU 804.

Figure 13:
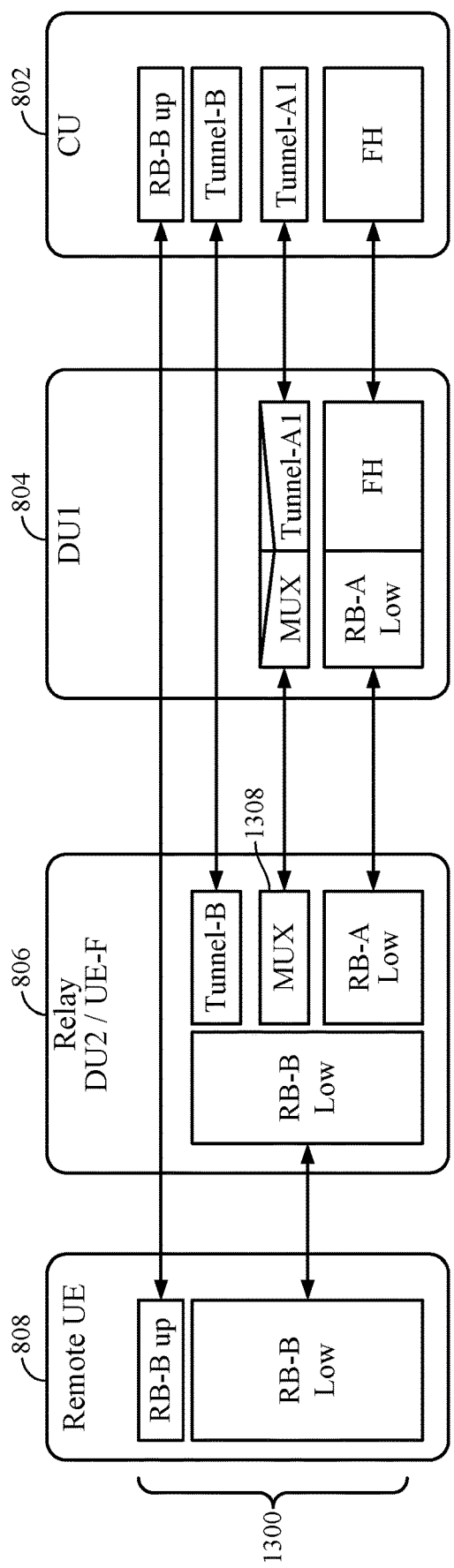
FIG. 13 illustrates an example communications protocol stack with a MUX layer between a lower and upper portion of a RB used for communicating remote data, in accordance with certain aspects of the present disclosure.
Figure 13A:
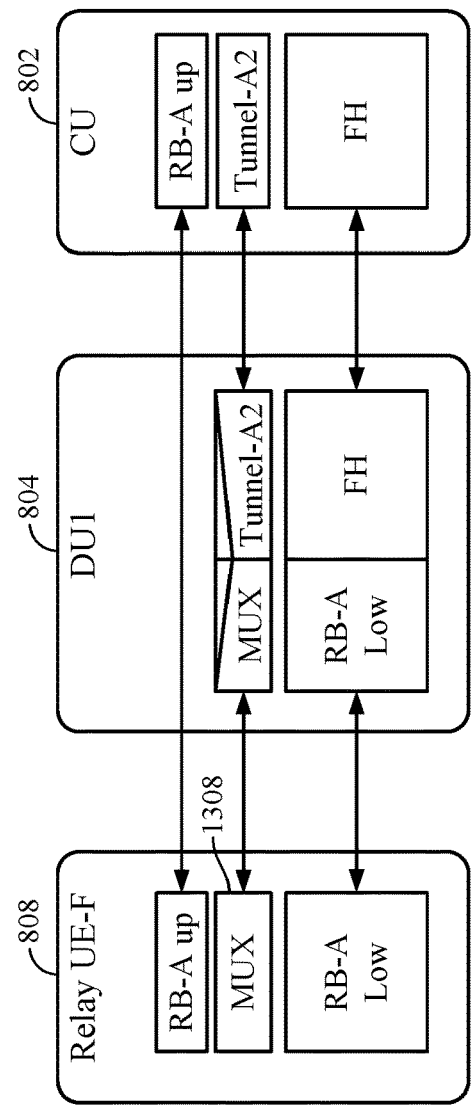
FIG. 13A illustrates an example communications protocol stack with a MUX layer between a lower and upper portion of a RB used for communicating local data, in accordance with certain aspects of the present disclosure.

FIG. 13 illustrates an example communications protocol stack with a MUX layer between a lower and upper portion of a RB used for communicating remote data, in accordance with certain aspects of the present disclosure. FIG. 13A illustrates an example communications protocol stack with a MUX layer between a lower and upper portion of a RB used for communicating local data, in accordance with certain aspects of the present disclosure.

In the example shown, UE 808 directly communicates wirelessly with relay DU 806, which communicates wirelessly with DU 804. DU 804 communicates with CU 802 (e.g., a single physical CU implementing CU-C 802a or CU-U 802b) via a wired interface. In particular, a RB 1300 is established between UE 808, relay DU 806, DU 804, and CU 802, which is shown as a communications protocol stack for the devices to communicate with one another.

In certain aspects, RB 1300 is the same as RB 1000 as discussed, except that MUX layer 1308 (corresponding to MUX layer 1008) only extends from relay DU 806 to DU 804 and not to CU 802 as with RB 1000. Therefore, instead of the MUX layer carrying a field which indicates if the encapsulated data refers to local data or remote data between DU 804 and CU 802, Tunnel-A includes the field which indicates if the encapsulated data refers to local data or remote data between DU 804 and CU 802.

In certain aspects, on the DL, CU 802 is configured to encapsulate DL packets destined for UE 808 (i.e., remote data) with the communications protocol stack shown in FIG. 13 in CU 802. Further, in certain aspects, on the DL, CU 802 is configured to encapsulate DL packets destined for relay DU 806 (i.e., local data) with the communications protocol stack shown in FIG. 13A in CU 802.

The relay DU 806 may be configured to process DL packets from a CU 802 using operations similar to operations 1100 described with respect to FIG. 11. However, when a DL packet arrives at DU 804 from CU 802, the DU 804 may process the tunnel header Tunnel-A and identify the multiplexing field. Based on the multiplexing field, DU 804 determines if the packet includes remote data or local data. The DU 804 then encapsulates the data with the MUX layer and sets a value in the MUX layer to indicate if the packet includes remote data or local data.

In certain aspects, on the UL, relay DU 806 is configured to encapsulate UL packets received from UE 808 (i.e., remote data) to send to CU 802 with the communications protocol stack shown in FIG. 13 in relay DU 806. Further, in certain aspects, on the UL, relay DU 806 is configured to encapsulate UL packets generated by relay DU 806 (i.e., local data) to send to CU 802 with the communications protocol stack shown in FIG. 13A in relay DU 806.

When a UL packet arrives at DU 804 from relay DU 806, the DU 804 may process RB-A low, and based on an ID of RB-A low, identifier a tunnel ID. The DU 804 then processes the MUX layer and translates a value in the MUX layer indicating if the packet includes remote data or local data to a corresponding field in the tunnel header Tunnel-A and then forwards the packet to CU 802.

The CU 802 may be configured to process UL packets from a CU 802 using operations similar to operations 1200 described with respect to FIG. 12. However, at 1204 and 1206, instead of processing the MUX layer field to determine if the packet includes remote data or local data, the CU 802 processes the field in the tunnel header Tunnel-A.

In certain aspects, techniques herein relate to separating local and remote traffic in a RB by inserting a MUX layer between the lower and upper portion of the RB can also be used for multi-hop scenarios where multiple relay DUs are used along the connection path between a UE and a CU. In particular, as described for single hop, each relay DU is configured to add a MUX layer above the lower portion of the RB communicated to the next DU.

Figure 14:
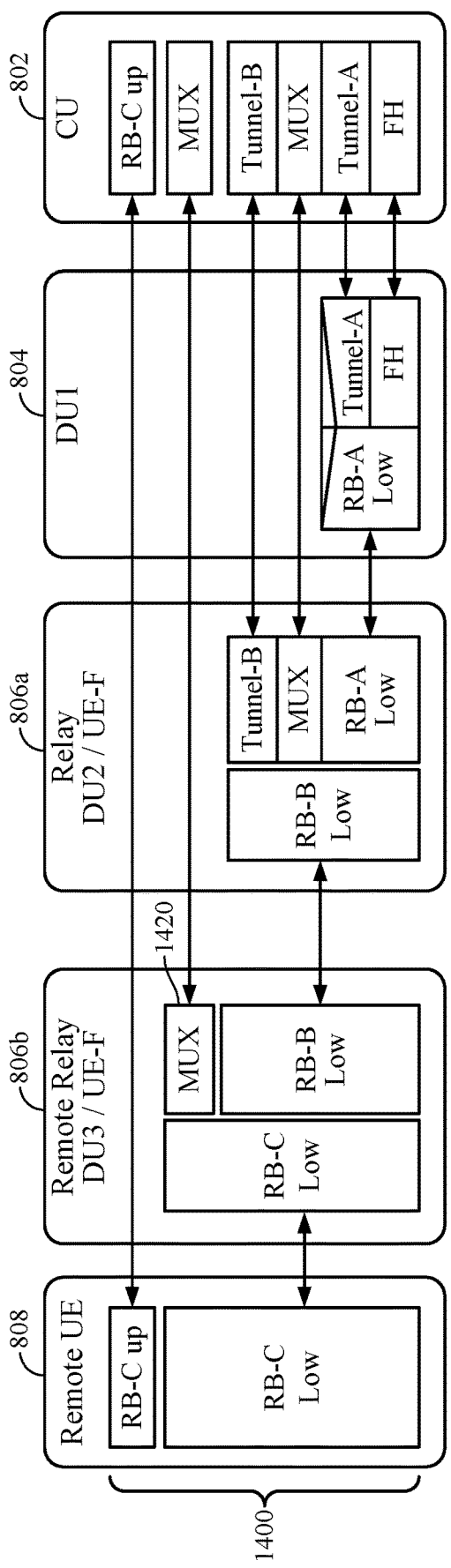
FIG. 14 illustrates an example communications protocol stack with a MUX layer between a lower and upper portion of a RB used for communicating remote data, in accordance with certain aspects of the present disclosure.
Figure 14A:
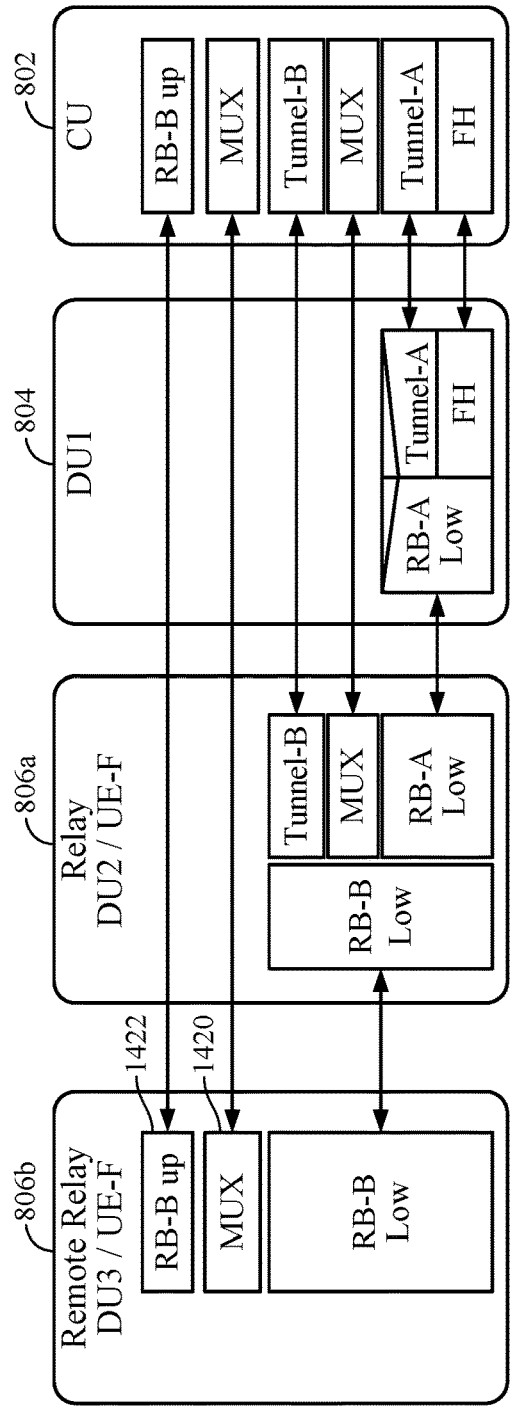
FIG. 14A illustrates an example communications protocol stack with a MUX layer between a lower and upper portion of a RB used for communicating local data, in accordance with certain aspects of the present disclosure.

FIG. 14 illustrates an example communications protocol stack with a MUX layer between a lower and upper portion of a RB used for communicating remote data, in accordance with certain aspects of the present disclosure. FIG. 14A illustrates an example communications protocol stack with a MUX layer between a lower and upper portion of a RB used for communicating local data, in accordance with certain aspects of the present disclosure.

In the example shown, UE 808 directly communicates wirelessly with relay DU 806b, which communicates wirelessly with relay DU 806a, which communicates wirelessly with DU 804. DU 804 communicates with CU 802 (e.g., a single physical CU implementing CU-C 802a or CU-U 802b) via a wired interface. In particular, a RB 1400 is established between UE 808, relay DU 806b, DU 806a, DU 804, and CU 802, which is shown as a communications protocol stack for the devices to communicate with one another.

In certain aspects, RB 1400 is divided into an RB upper portion (RB-C Up) and an RB lower portion (RB-C Low). In certain aspects, the UE 808 only sustains the RB-C Low to connect with relay DU 806b (e.g., using a DU function of DU 806b) and sustains the RB-C Up to connect with CU 802 (via relay DU 806b, relay DU 806a, and DU 804).

In certain aspects, relay DU 806b (e.g., a UE function of relay DU 806b) is configured to sustain the RB-C Low of RB 1400 to communicate with relay DU 806a and CU 802. In particular, RB-C Low is divided into multiple portions including a RB lower portion (RB-B Low). RB-B Low of RB 1400 may be used similar to RB-B Low 1004 of RB 1000 in that relay DU 806b only sustains the RB-B Low to connect with relay DU 806a (e.g., using a DU function of DU 806b).

Relay DU 806b is further configured to insert a MUX layer 1420 above RB-B low which includes a field in the protocol stack which indicates if the encapsulated data refers to local data or remote data of relay DU 806b. The relay DU 806b sustains the MUX layer 1420 with CU 802.

The remaining use of RB 1400 is similar to RB 1000 as described. However, the CU 802 processes multiple MUX layers corresponding to the number of relays DU 806 used in the multi-hop process to determine whether the data in higher layers is for the corresponding relay DU 806 (i.e., local data), or for another relay DU 806 or UE 808 (i.e., remote data).

In certain aspects, for remote data from UE 808, as shown in FIG. 14, relay DU 806b extends RB-C Low to communicate with CU 802 (via relay DU 806b and DU 804) by sustaining with CU 802 an additional MUX layer 1420.

In certain aspects, for local data of relay DU 806b, as shown in FIG. 14A, relay DU 806b further sustains a RB upper portion (RB-B up) 1422 with CU 802 to communicate with CU 802.

In certain aspects, on the DL, CU 802 is configured to encapsulate DL packets destined for UE 808 (i.e., remote data) with the communications protocol stack shown in FIG. 14 in CU 802. Further, in certain aspects, on the DL, CU 802 is configured to encapsulate DL packets destined for relay DU 806b (i.e., local data) with the communications protocol stack shown in FIG. 14A in CU 802.

In certain aspects, on the UL, relay DU 806b is configured to encapsulate UL packets received from UE 808 (i.e., remote data) to send to CU 802 with the communications protocol stack shown in FIG. 14 in relay DU 806b. Further, in certain aspects, on the UL, relay DU 806b is configured to encapsulate UL packets generated by relay DU 806b (i.e., local data) to send to CU 802 with the communications protocol stack shown in FIG. 14A in relay DU 806b. In certain aspects, RB 1400 is processed similar to RB 1000.

In certain aspects, instead of extending the MUX layer from relay DU 806 to CU 802, the MUX layer may only be extended between relay DU 806 to DU 804.

Figure 15:
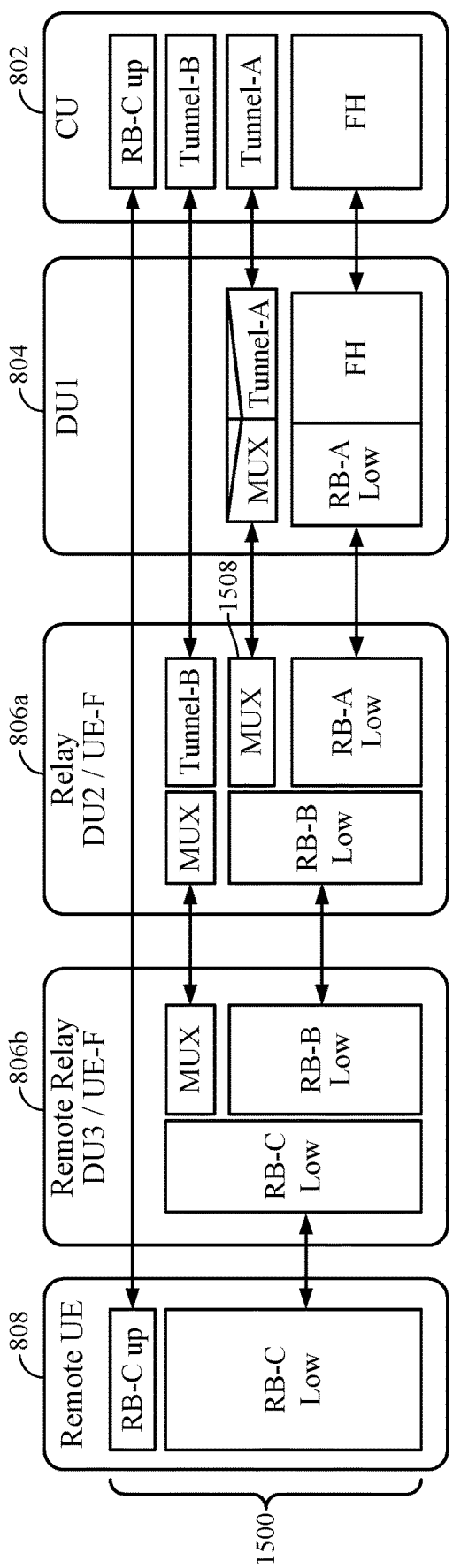
FIG. 15 illustrates an example communications protocol stack with a MUX layer between a lower and upper portion of a RB used for communicating remote data, in accordance with certain aspects of the present disclosure.
Figure 15A:
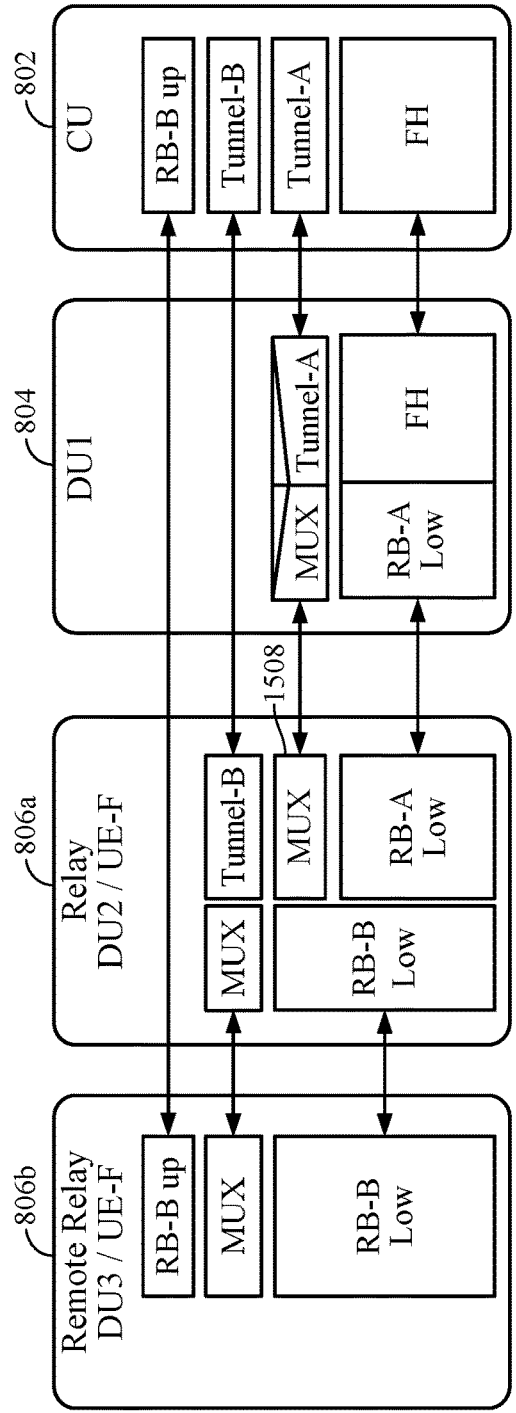
FIG. 15A illustrates an example communications protocol stack with a MUX layer between a lower and upper portion of a RB used for communicating local data, in accordance with certain aspects of the present disclosure.

FIG. 15 illustrates an example communications protocol stack with a MUX layer between a lower and upper portion of a RB used for communicating remote data, in accordance with certain aspects of the present disclosure. FIG. 15A illustrates an example communications protocol stack with a MUX layer between a lower and upper portion of a RB used for communicating local data, in accordance with certain aspects of the present disclosure.

In the example shown, UE 808 directly communicates wirelessly with relay DU 806b, which communicates wirelessly with relay DU 806a, which communicates wirelessly with DU 804. DU 804 communicates with CU 802 (e.g., a single physical CU implementing CU-C 802a or CU-U 802b) via a wired interface. In particular, a RB 1400 is established between UE 808, relay DU 806b, DU 806a, DU 804, and CU 802, which is shown as a communications protocol stack for the devices to communicate with one another.

In certain aspects, RB 1500 is the same as RB 1400 as discussed, except that MUX layer 1508 (corresponding to MUX layer 1008 as shown in RB 1000 and also included in RB 1400 as discussed) only extends from relay DU 806a to DU 804 and not to CU 802 as with RB 1400. Therefore, instead of the MUX layer carrying a field which indicates if the encapsulated data refers to local data or remote data between DU 804 and CU 802, Tunnel-A includes the field which indicates if the encapsulated data refers to local data or remote data between DU 804 and CU 802, as discussed with respect to RB 1300.

In certain aspects, on the DL, CU 802 is configured to encapsulate DL packets destined for UE 808 (i.e., remote data) with the communications protocol stack shown in FIG. 15 in CU 802. Further, in certain aspects, on the DL, CU 802 is configured to encapsulate DL packets destined for relay DU 806b (i.e., local data) with the communications protocol stack shown in FIG. 15A in CU 802.

In certain aspects, on the UL, relay DU 806b is configured to encapsulate UL packets received from UE 808 (i.e., remote data) to send to CU 802 with the communications protocol stack shown in FIG. 15 in relay DU 806b. Further, in certain aspects, on the UL, relay DU 806b is configured to encapsulate UL packets generated by relay DU 806b (i.e., local data) to send to CU 802 with the communications protocol stack shown in FIG. 15A in relay DU 806. In certain aspects, RB 1500 is processed similar to RB 1300.

In certain aspects, techniques herein relate to separating local and remote traffic in a RB by inserting a MUX layer between the lower and upper portion of the RB can also be used for multi-hop scenarios where multiple relay DUs are used along the connection path between a UE and a CU in the presence of a routing layer in the protocol stack. In particular, as described for single hop, each relay DU is configured to add a MUX layer above the lower portion of the RB communicated to the next DU. However, instead of sustaining the MUX layer at each relay DU with the CU, and accordingly using multiple tunnels for each DU, the multiple tunnels and MUX layers can be replaced with a flat routing layer (RT). In particular, the MUX layer is used to differentiation between RT for remote data and an RB upper portion for local data of the relay DU.

Figure 16:
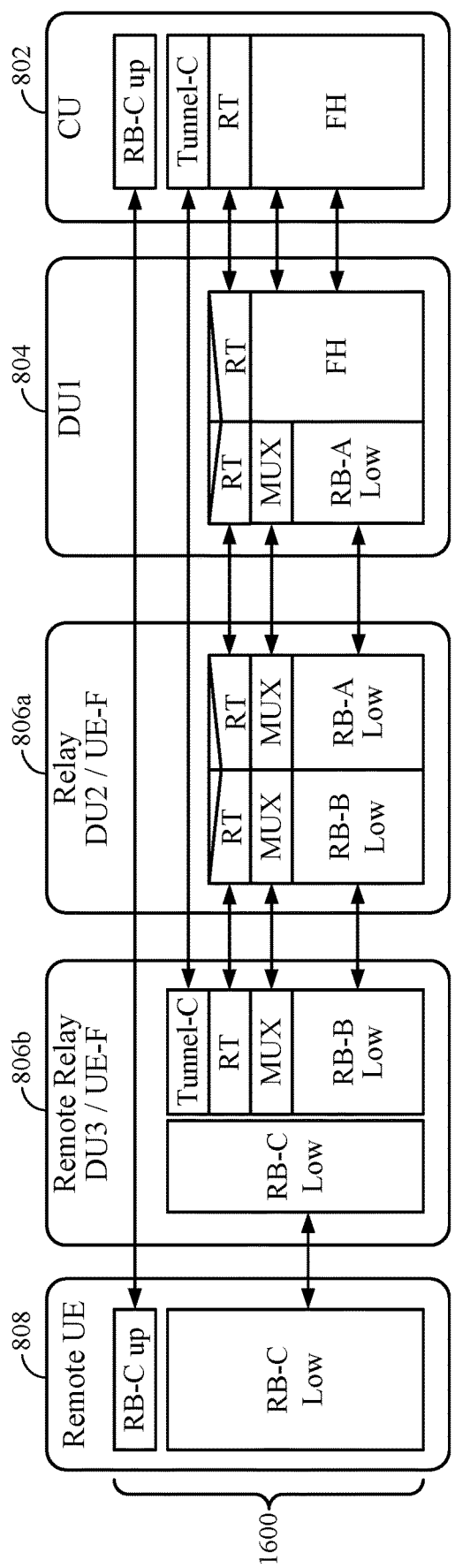
FIG. 16 illustrates an example communications protocol stack with a MUX layer between a lower and upper portion of a RB used for communicating remote data, in accordance with certain aspects of the present disclosure.
Figure 16A:
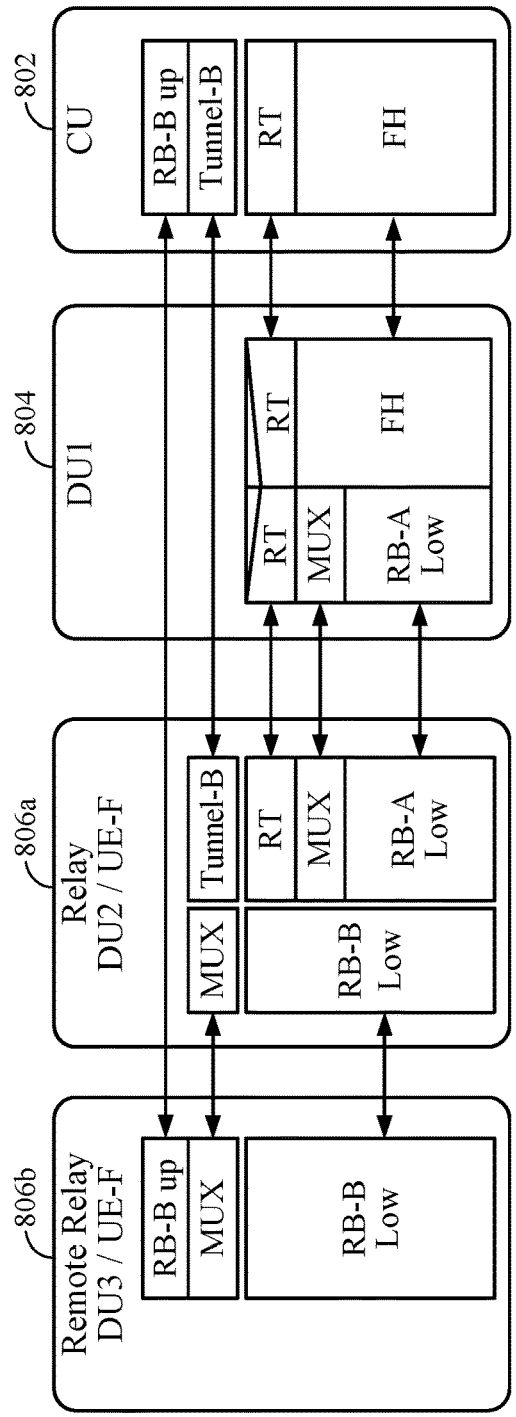
FIG. 16A illustrates an example communications protocol stack with a MUX layer between a lower and upper portion of a RB used for communicating local data, in accordance with certain aspects of the present disclosure.

FIG. 16 illustrates an example communications protocol stack with a MUX layer between a lower and upper portion of a RB used for communicating remote data, in accordance with certain aspects of the present disclosure. FIG. 16A illustrates an example communications protocol stack with a MUX layer between a lower and upper portion of a RB used for communicating local data, in accordance with certain aspects of the present disclosure.

In the example shown, UE 808 directly communicates wirelessly with relay DU 806*b*, which communicates wirelessly with relay DU 806*a*, which communicates wirelessly with DU 804. DU 804 communicates with CU 802 (e.g., a single physical CU implementing CU-C 802*a* or CU-U 802*b*) via a wired interface. In particular, a RB 1600 is established between UE 808, relay DU 806*b*, DU 806*a*, DU 804, and CU 802, which is shown as a communications protocol stack for the devices to communicate with one another.

In certain aspects, RB 1600 is divided into an RB upper portion (RB-C Up) and an RB lower portion (RB-C Low). In certain aspects, the UE 808 only sustains the RB-C Low to connect with relay DU 806*b* (e.g., using a DU function of DU 806*b*) and sustains the RB-C Up to connect with CU 802 (via relay DU 806*b*, relay DU 806*a*, and DU 804).

In certain aspects, relay DU 806*b* (e.g., a UE function of relay DU 806*b*) is configured to sustain the RB-C Low of RB 1600 to communicate with relay DU 806*a* and CU 802. In particular, RB-C Low is divided into multiple portions including a RB lower portion (RB-B Low). Relay DU 806*b* may only sustain the RB-B Low to connect with relay DU 806*a* (e.g., using a DU function of DU 806*b*).

In certain aspects, for remote data from UE 808, as shown in FIG. 16, relay DU 806*b* extends RB-C Low to communicate with CU 802 (via relay DU 806*a* and DU 804) by sustaining with CU 802 a Tunnel C. The Tunnel C may include a tunnel ID that maps to UE 808 so that packets can be forwarded to the correct UE 808 based on the tunnel ID included in Tunnel-C by relay DU 806*b*, without relay DU 806*b* needing to read RB-C Up. The relay DU 806*b* further sustains a routing (RT) layer with relay DU 806*a* that includes routing information for routing packets between relay DU 806*b* and relay DU 806*a*.

In certain aspects, for local data of relay DU 806*b*, as shown in FIG. 16A, instead of using a Tunnel C, relay DU 806*b* sustains a RB upper portion (RB-B up) with CU 802 to communicate with CU 802.

To distinguish between local data and remote data of relay DU 806*b*, relay DU 806*b* inserts a MUX layer between RB-B low and either RB-B Up or RT and Tunnel C. The MUX layer may be extended across all relay DUs 806 including relay DU 806*a* to DU 804. Relay DU 806*a* and DU 804 may be configured to change the routing information to indicate routing of packets between the appropriate devices.

Figure 17:
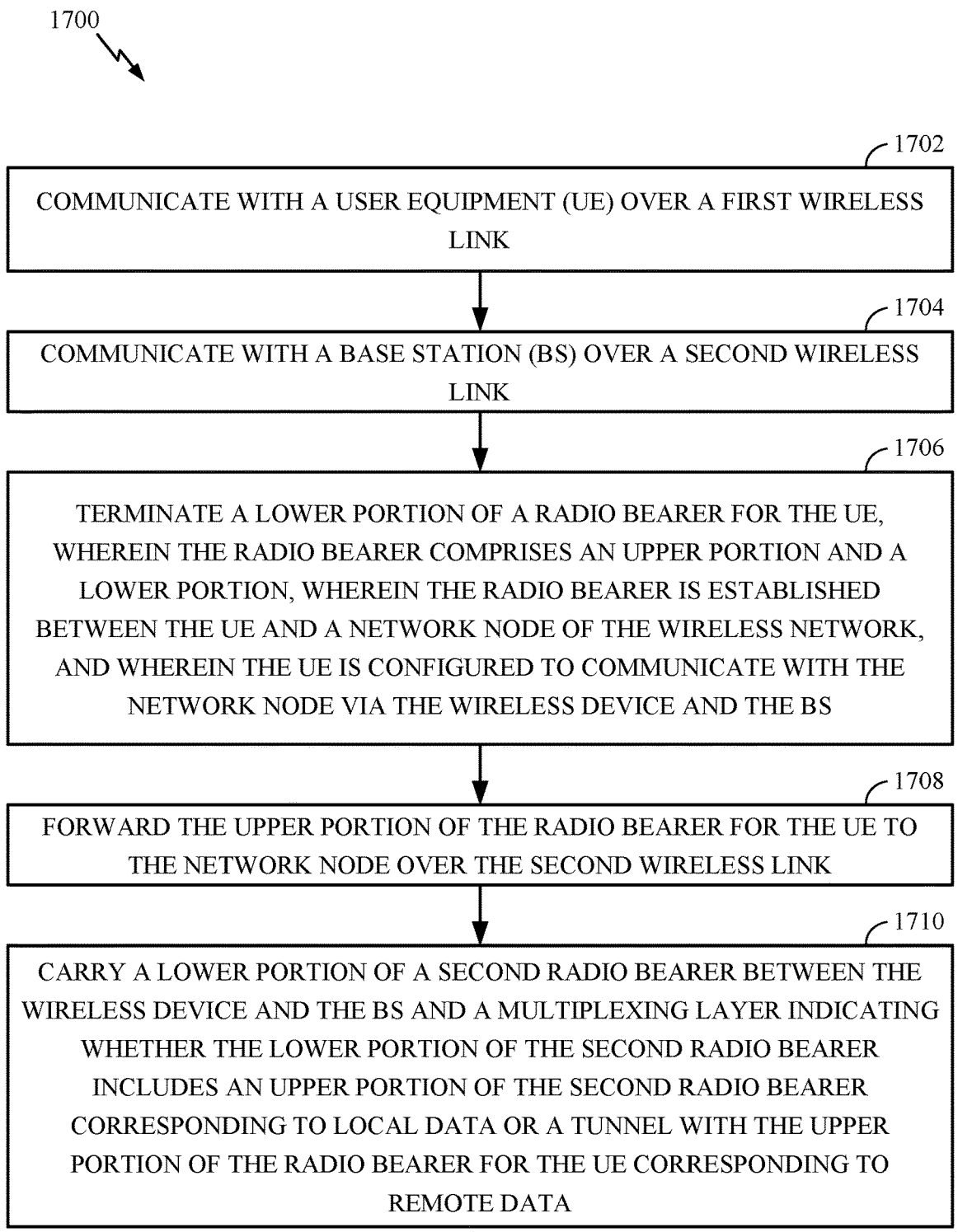
FIG. 17 illustrates example operations that may be performed by a wireless device such as a relay DU for communicating remote and local data in a wireless fronthaul of a wireless network, in accordance with aspects of the present disclosure.

FIG. 17 illustrates example operations that may be performed by a wireless device such as a relay DU (e.g., relay DU 806) for communicating remote and local data in a wireless fronthaul of a wireless network, in accordance with aspects of the present disclosure.

Operations 1700 begin at block 1702 by relay DU communicating with a user equipment (UE) over a first wireless link. Further, at block 1704, the relay DU communicates with a base station (BS) over a second wireless link. Continuing, at block 1706, the relay DU terminates a lower portion of a radio bearer for the UE, wherein the radio bearer comprises an upper portion and a lower portion, wherein the radio bearer is established between the UE and a network node of the wireless network, and wherein the UE is configured to communicate with the network node via the relay DU and the BS.

Further, at block 1708, the relay DU forwards the upper portion of the radio bearer for the UE to the network node over the second wireless link. At block 1710, the relay DU carries a lower portion of a second radio bearer between the relay DU and the BS and a multiplexing layer indicating whether the lower portion of the second radio bearer includes an upper portion of the second radio bearer corresponding to local data or a tunnel with the upper portion of the radio bearer for the UE corresponding to remote data.

Figure 18:
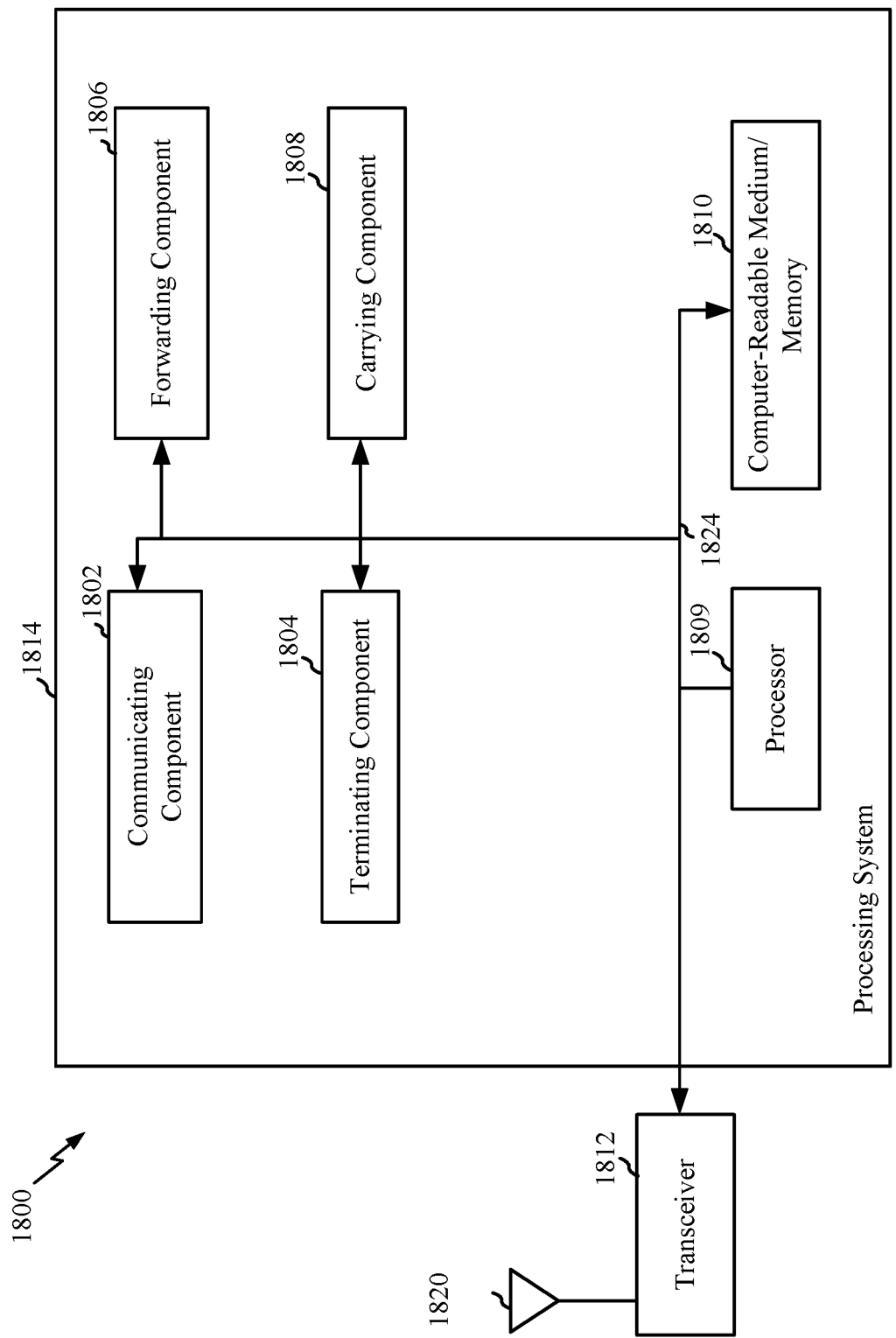
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 17. The communications device 1800 includes a processing system 1814 coupled to a transceiver 1812. The transceiver 1812 is configured to transmit and receive signals for the communications device 1800 via an antenna 1820, such as the various signals described herein. The processing system 1814 may be configured to perform processing functions for the communications device 1800, including processing signals received and/or to be transmitted by the communications device 1800.

The processing system 1814 includes a processor 1809 coupled to a computer-readable medium/memory 1810 via a bus 1824. In certain aspects, the computer-readable medium/memory 1810 is configured to store instructions that when executed by processor 1809, cause the processor 1809 to perform the operations illustrated in FIG. 17, or other operations for performing the various techniques discussed herein.

In certain aspects, the processing system 1814 further includes a communicating component 1802 for performing the operations illustrated at 1702 and/or 1704 in FIG. 17. Additionally, the processing system 1814 includes a terminating component 1804 for performing the operations illustrated at 1706 in FIG. 17. The processing system 1814 also includes a forwarding component 1806 for performing the operations illustrated at 1708 in FIG. 17. The processing system 1814 further includes a carrying component 1808 for performing the operations illustrated at 1710 in FIG. 17.

The communicating component 1802, terminating component 1804, forwarding component 1806, and carrying component 1808 may be coupled to the processor 1809 via bus 1824. In certain aspects, the communicating component 1802, terminating component 1804, forwarding component 1806, and carrying component 1808 may be hardware circuits. In certain aspects, the communicating component 1802, terminating component 1804, forwarding component 1806, and carrying component 1808 may be software components that are executed and run on processor 1809.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 11, 12, and/or 17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for communicating remote and local data in a wireless fronthaul of a wireless network, the wireless fronthaul comprising a relay configured to wirelessly communicate with a user equipment (UE) over a first wireless link and a base station (BS) over a second wireless link, wherein a radio bearer comprising an upper portion and a lower portion is established between the UE and a network node of the wireless network, and wherein the UE communicates with the network node via the relay and the BS, the method comprising:
    terminating, at the relay, the lower portion of the radio bearer for the UE;
    forwarding, at the relay, the upper portion of the radio bearer for the UE to the network node over the second wireless link; and
    carrying, at the relay, a lower portion of a second radio bearer between the relay and the BS and a multiplexing layer indicating whether the lower portion of the radio bearer includes an upper portion of the second radio bearer corresponding to local data or a tunnel with the upper portion of the radio bearer for the UE corresponding to remote data.

2. The method of claim 1, wherein the lower portion of the radio bearer comprises a physical (PHY) layer, a medium access control (MAC) layer, and a radio link control (RLC) layer, and wherein the upper portion of the radio bearer comprises a packet data convergence protocol (PDCP) layer.

3. The method of claim 1, wherein the network node comprises a central unit.

4. The method of claim 1, wherein the relay and the base station each comprises a separate distributed unit.

5. The method of claim 1, wherein the radio bearer is one of a signaling radio bearer or a data radio bearer.

6. The method of claim 1, wherein the base station comprises a second relay.

7. The method of claim 1, further comprising processing downlink packets received at the relay including the multiplexing layer indicating the lower portion of the radio bearer includes the upper portion of the second radio bearer.

8. The method of claim 1, further comprising forwarding downlink packets received at the relay to the UE based on the downlink packets including the multiplexing layer indicating the lower portion of the radio bearer includes the tunnel with the upper portion of the radio bearer for the UE.

9. A wireless device for communicating remote and local data in a wireless fronthaul of a wireless network, the wireless device comprising:
    a memory; and
    a processor coupled to the memory, the processor being configured to:
        communicate with a user equipment (UE) over a first wireless link;
        communicate with a base station (BS) over a second wireless link;
        terminate a lower portion of a radio bearer for the UE, wherein the radio bearer comprises an upper portion and a lower portion, wherein the radio bearer is established between the UE and a network node of the wireless network, and wherein the UE is configured to communicate with the network node via the wireless device and the BS;
        forward the upper portion of the radio bearer for the UE to the network node over the second wireless link; and
        carry a lower portion of a second radio bearer between the wireless device and the BS and a multiplexing layer indicating whether the lower portion of the radio bearer includes an upper portion of the second radio bearer corresponding to local data or a tunnel with the upper portion of the radio bearer for the UE corresponding to remote data.

10. The wireless device of claim 9, wherein the lower portion of the radio bearer comprises a physical (PHY) layer, a medium access control (MAC) layer, and a radio link control (RLC) layer, and wherein the upper portion of the radio bearer comprises a packet data convergence protocol (PDCP) layer.

11. The wireless device of claim 9, wherein the network node comprises a central unit.

12. The wireless device of claim 9, wherein the wireless device and the base station each comprises a separate distributed unit.

13. The wireless device of claim 9, wherein the radio bearer is one of a signaling radio bearer or a data radio bearer.

14. The wireless device of claim 9, wherein the base station comprises a relay.

15. The wireless device of claim 9, wherein the processor is further configured to process downlink packets received at the wireless device including the multiplexing layer indicating the lower portion of the radio bearer includes the upper portion of the second radio bearer.

16. The wireless device of claim 9, wherein the processor is further configured to forward downlink packets received at the wireless device to the UE based on the downlink packets including the multiplexing layer indicating the lower portion of the radio bearer includes the tunnel with the upper portion of the radio bearer for the UE.

17. A non-transitory computer readable medium having instructions stored thereon that when executed by a processor of a relay cause the relay to perform a method for communicating remote and local data in a wireless fronthaul of a wireless network, the wireless fronthaul comprising the relay configured to wirelessly communicate with a user equipment (UE) over a first wireless link and a base station (BS) over a second wireless link, wherein a radio bearer comprising an upper portion and a lower portion is established between the UE and a network node of the wireless network, and wherein the UE communicates with the network node via the relay and the BS, the method comprising:
 terminating, at the relay, the lower portion of the radio bearer for the UE;
 forwarding, at the relay, the upper portion of the radio bearer for the UE to the network node over the second wireless link; and
 carrying, at the relay, a lower portion of a second radio bearer between the relay and the BS and a multiplexing layer indicating whether the lower portion of the radio bearer includes an upper portion of the second radio bearer corresponding to local data or a tunnel with the upper portion of the radio bearer for the UE corresponding to remote data.

18. The non-transitory computer readable medium of claim 17, wherein the lower portion of the radio bearer comprises a physical (PHY) layer, a medium access control (MAC) layer, and a radio link control (RLC) layer, and wherein the upper portion of the radio bearer comprises a packet data convergence protocol (PDCP) layer.

19. The non-transitory computer readable medium of claim 17, wherein the network node comprises a central unit.

20. The non-transitory computer readable medium of claim 17, wherein the relay and the base station each comprises a separate distributed unit.

21. The non-transitory computer readable medium of claim 17, wherein the method further comprises processing downlink packets received at the relay including the multiplexing layer indicating the lower portion of the radio bearer includes the upper portion of the second radio bearer.

22. The non-transitory computer readable medium of claim 17, wherein the method further comprises forwarding downlink packets received at the relay to the UE based on the downlink packets including the multiplexing layer indicating the lower portion of the radio bearer includes the tunnel with the upper portion of the radio bearer for the UE.

23. A wireless device for communicating remote and local data in a wireless fronthaul of a wireless network, the wireless device comprising:
 means for communicating with a user equipment (UE) over a first wireless link;
 means for communicating with a base station (BS) over a second wireless link;
 means for terminating a lower portion of a radio bearer for the UE, wherein the radio bearer comprises an upper portion and a lower portion, wherein the radio bearer is established between the UE and a network node of the wireless network, and wherein the UE is configured to communicate with the network node via the wireless device and the BS;
 means for forwarding the upper portion of the radio bearer for the UE to the network node over the second wireless link; and
 means for carrying a lower portion of a second radio bearer between the wireless device and the B S and a multiplexing layer indicating whether the lower portion of the radio bearer includes an upper portion of the second radio bearer corresponding to local data or a tunnel with the upper portion of the radio bearer for the UE corresponding to remote data.

24. The wireless device of claim 23, wherein the lower portion of the radio bearer comprises a physical (PHY) layer, a medium access control (MAC) layer, and a radio link control (RLC) layer, and wherein the upper portion of the radio bearer comprises a packet data convergence protocol (PDCP) layer.

25. The wireless device of claim 23, wherein the network node comprises a central unit.

26. The wireless device of claim 23, wherein the wireless device and the base station each comprises a separate distributed unit.

27. The wireless device of claim 23, wherein the radio bearer is one of a signaling radio bearer or a data radio bearer.

28. The wireless device of claim 23, wherein the base station comprises a relay.

29. The wireless device of claim 23, further comprising means for processing downlink packets received at the wireless device including the multiplexing layer indicating the lower portion of the radio bearer includes the upper portion of the second radio bearer.

30. The wireless device of claim 23, further comprising means for forwarding downlink packets received at the wireless device to the UE based on the downlink packets including the multiplexing layer indicating the lower portion of the radio bearer includes the tunnel with the upper portion of the radio bearer for the UE.

* * * * *